United States Patent
Ohnishi et al.

(10) Patent No.: US 10,627,298 B2
(45) Date of Patent: Apr. 21, 2020

(54) TORQUE SENSOR

(71) Applicant: HITACHI AUTOMOTIVE SYSTEMS, LTD., Hitachinaka-shi, Ibaraki (JP)

(72) Inventors: Teruyuki Ohnishi, Atsugi (JP); Kohtaro Shiino, Isehara (JP); Makoto Kimura, Yokohama (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/308,431

(22) PCT Filed: Mar. 15, 2017

(86) PCT No.: PCT/JP2017/010435
§ 371 (c)(1),
(2) Date: Dec. 7, 2018

(87) PCT Pub. No.: WO2017/212732
PCT Pub. Date: Dec. 14, 2017

(65) Prior Publication Data
US 2019/0195709 A1 Jun. 27, 2019

(30) Foreign Application Priority Data
Jun. 8, 2016 (JP) ................................. 2016-114227

(51) Int. Cl.
*G01L 3/10* (2006.01)
*B62D 6/10* (2006.01)
*B62D 5/04* (2006.01)

(52) U.S. Cl.
CPC ............... *G01L 3/101* (2013.01); *B62D 6/10* (2013.01); *G01L 3/10* (2013.01); *B62D 5/0481* (2013.01)

(58) Field of Classification Search
CPC .............................. G01L 3/101; B62D 5/0481
(Continued)

(56) References Cited

U.S. PATENT DOCUMENTS

| 8,800,388 B2 * | 8/2014 | Takahashi | ............... G01L 3/104 73/862.331 |
| 9,435,703 B2 * | 9/2016 | Maehara | ................ B62D 15/02 |

(Continued)

FOREIGN PATENT DOCUMENTS

| JP | H07-161858 A | 6/1995 |
| JP | 2002-243768 A | 8/2002 |

(Continued)

*Primary Examiner* — Octavia Hollington
(74) *Attorney, Agent, or Firm* — Foley & Lardner LLP

(57) ABSTRACT

Provided is a torque sensor that allows a surface-mount magnetic sensor to be disposed between magnetic collection rings adjacent to each other in a radial direction with respect to a rotational axis. A torque sensor includes a rotational member including a first shaft and a second shaft connected to each other via a torsion bar, a first magnetic collection mechanism and a second magnetic collection mechanism each formed into a circular-arc shape along a direction around a rotational axis of the rotational member with use of a magnetic material and disposed so as to face each other in a radial direction of the rotational member, a surface-mount first magnetic sensor and second magnetic sensor inserted between the first magnetic collection mechanism and the second magnetic collection mechanism and each including a Hall element configured to detect a change in a magnetic field between the first magnetic collection mechanism and the second magnetic collection mechanism, and a sensor substrate on which the first magnetic sensor and the second magnetic sensor are mounted. The torque sensor detects a torque generated on the rotational member based on an output signal of the first magnetic sensor or the second magnetic sensor.

15 Claims, 14 Drawing Sheets

(58) Field of Classification Search
USPC ................. 73/862.325, 862.331–862.338
See application file for complete search history.

(56) References Cited

U.S. PATENT DOCUMENTS

| | | | |
|---|---|---|---|
| 9,689,762 B2* | 6/2017 | Takahashi | B62D 6/10 |
| 2004/0159488 A1* | 8/2004 | Matsumoto | G01L 5/221 |
| | | | 180/443 |
| 2008/0028870 A1 | 2/2008 | Tokumoto et al. | |
| 2011/0214515 A1 | 9/2011 | Kim et al. | |
| 2011/0221432 A1 | 9/2011 | Oota | |
| 2014/0076655 A1 | 3/2014 | Yoshida et al. | |
| 2016/0083008 A1 | 3/2016 | Murakami et al. | |
| 2016/0153850 A1 | 6/2016 | Takahashi et al. | |

FOREIGN PATENT DOCUMENTS

| | | |
|---|---|---|
| JP | 2005-345284 A | 12/2005 |
| JP | 2008-216019 A | 9/2008 |
| JP | 2011-191094 A | 9/2011 |
| JP | 2011-529194 A | 12/2011 |
| JP | 2014-055910 A | 3/2014 |
| JP | 2016-60408 A | 4/2016 |
| JP | 2016-102671 A | 6/2016 |

* cited by examiner

A-A

B-B

TORQUE SENSOR

TECHNICAL FIELD

The present invention relates to a torque sensor.

BACKGROUND ART

As this kind of technique, there is disclosed a technique discussed in the following patent literature, PTL 1. PTL 1 discloses a torque sensor that detects a torque by detecting, with use of a magnetic sensor, a change in a magnetic flux passing through between magnetic collection rings adjacent to each other in a radial direction with respect to an input shaft due to a relative rotation between the input shaft and an output shaft connected to each other via a torsion bar.

CITATION LIST

Patent Literature

PTL 1: Japanese Patent Application Public Disclosure No. 2014-055910

SUMMARY OF INVENTION

Technical Problem

In the technique discussed in PTL 1, a terminal extends from a detection portion of the magnetic sensor to one side. With the magnetic sensor disposed between the adjacent magnetic collection rings, the terminal extends toward an axial direction of the input shaft, and a distal end thereof is connected to a control board. However, a surface-mount magnetic sensor includes terminals extending in both directions while sandwiching the detection portion therebetween. Employment of a similar method to the technique discussed in PTL 1 raises such a problem that the surface-mount magnetic sensor cannot be disposed between the magnetic collection rings.

The present invention has been made in consideration of the above-described problem, and an object thereof is to provide a torque sensor that allows the surface-mount magnetic sensor to be disposed between the magnetic collection rings (magnetic collection mechanisms) adjacent to each other in the radial direction with respect to the input shaft (a rotational axis).

Solution to Problem

According to one embodiment of the present invention, a torque sensor includes a rotational member including a first shaft and a second shaft connected to each other via a torsion bar, a first magnetic collection mechanism and a second magnetic collection mechanism each formed into a circular-arc shape along a direction around a rotational axis of the rotational member with use of a magnetic material and disposed so as to face each other in a radial direction of the rotational member, a surface-mount first magnetic sensor and second magnetic sensor inserted between the first magnetic collection mechanism and the second magnetic collection mechanism and including a Hall element configured to detect a change in a magnetic field between the first magnetic collection mechanism and the second magnetic collection mechanism, and a sensor substrate configured to allow the first magnetic sensor and the second magnetic sensor to be mounted thereon. The torque sensor detects a torque generated on the rotational member based on an output signal of the first magnetic sensor or the second magnetic sensor.

Therefore, the surface-mount first magnetic sensor and second magnetic sensor can be disposed between the first magnetic collection mechanism and the second magnetic collection mechanism by being inserted in the direction of the rotational axis.

DESCRIPTION OF EMBODIMENTS

First Embodiment

[Configuration of Power Steering Apparatus]

Figure 1:
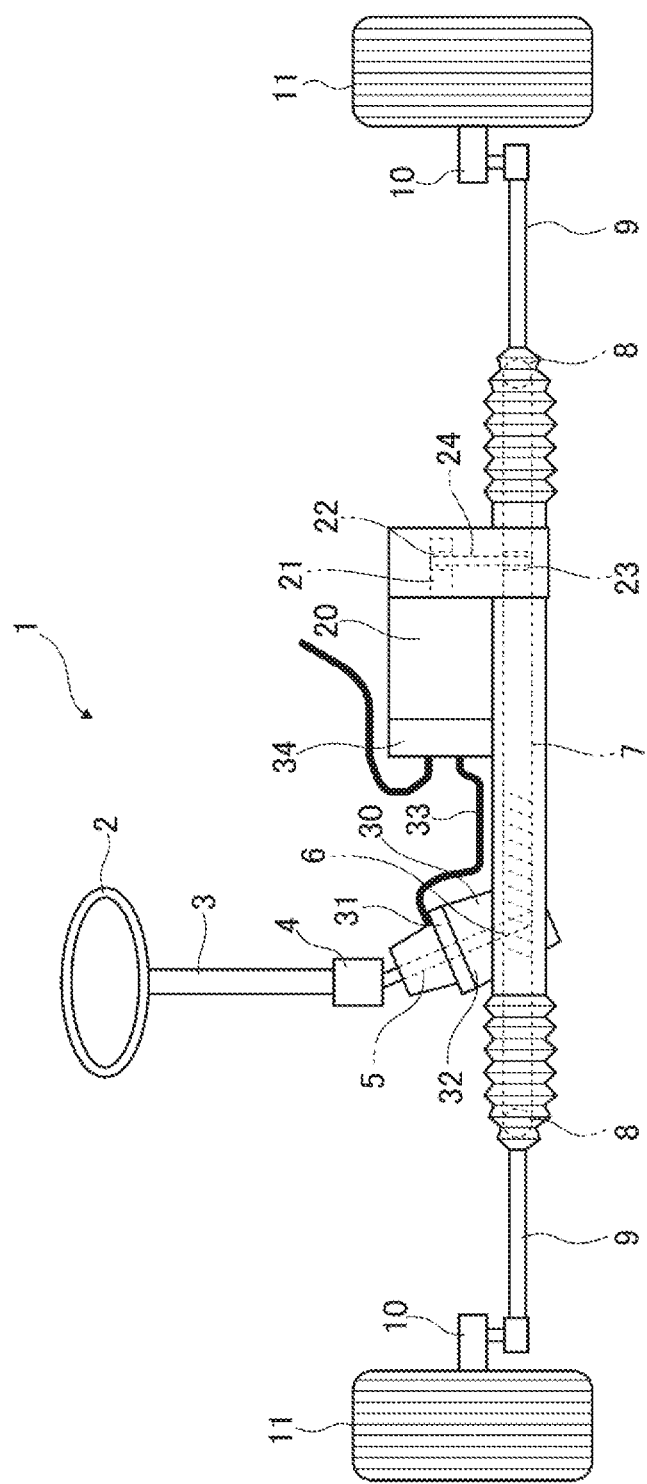
FIG. 1 schematically illustrates an entire electric power steering apparatus according to a first embodiment.

FIG. 1 schematically illustrates an entire electric power steering apparatus 1 according to a first embodiment. The electric power steering apparatus 1 includes a steering wheel 2, an intermediate shaft 3, a steering shaft 5, a pinion shaft 6, and a rack bar 7. These components form a steering mechanism that transmits a steering torque input to the steering wheel 2 by a driver to the rack bar 7. The steering shaft 5 and the pinion shaft 6 form a rotational member 50.

The intermediate shaft 3 is integrally rotatably provided on the steering wheel 2. The steering shaft 5 is connected to the intermediate shaft 3 via a universal joint 4. The pinion shaft 6 is connected to the steering shaft 5. Teeth are formed on the pinion shaft 6 on an outer periphery of a distal end thereof. The pinion shaft 6 is meshed with teeth of the rack bar 7. A steering force input to the steering wheel 2 by the driver is transmitted to the rack bar 7 via the intermediate shaft 3, the steering shaft 5, and the pinion shaft 6. Due to the meshed engagement between the teeth of the pinion shaft 6 and the rack bar 7, a motion of the pinion shaft 6 in a rotational direction is transmitted while being converted into a motion in a vehicle width direction on the rack bar 7.

The electric power steering apparatus 1 includes an electric motor 20, a first pulley 22, a second pulley 23, and a belt 24. These components form a steering assist mechanism that transmits an assist torque generated by the electric motor 20 to the rack bar 7.

The first pulley 22 is provided integrally rotatably on an output shaft 21 of the electric motor 20. The second pulley 23 is connected to the rack bar 7 via a ball screw mechanism. The belt 24 is wound between the first pulley 22 and the second pulley 23. A rotation of the output shaft 21 of the electric motor 20 is transmitted while being slowed down between the first pulley 22 and the second pulley 23. Due to the ball screw mechanism, a motion of the second pulley 23 in a rotational direction is transmitted while being converted into a motion in the vehicle width direction on the rack bar 7.

The electric power steering apparatus 1 includes tie rods 9, knuckle arms 10, and turning target wheels 11.

The tie rods 9 are connected to both ends of the rack bar 7 via ball joints 8, respectively. The knuckle arm 10 is connected to a distal end of each of the tie rods 9. The turning target wheel 11 is connected to the knuckle arm 10. The motion of the rack bar 7 in the vehicle width direction is transmitted to the knuckle arm 10 via the tie rod 9. Due to the knuckle arm 10, the motion in the vehicle width direction that is transmitted from the rack bar 7 is transmitted while being converted as a motion of the turning target wheel 11 in a turning direction.

The electric power steering apparatus 1 includes a steering angle sensor 31, a steering torque sensor 32, and a motor controller 34.

The steering angle sensor 31 is provided at the steering shaft 5. The steering torque sensor 32 is provided so as to extend across the steering shaft 5 and the pinion shaft 6. The steering angle sensor 31 and the steering torque sensor 32 are contained in a sensor housing 30. The motor controller 34 is provided on the electric motor 20. The steering angle sensor 31 detects a steering angle of the steering wheel 2 according to the steering by the driver. The steering torque sensor 32 detects a steering torque input to the steering wheel 2 according to the steering by the driver. The motor controller 34 calculates a signal for controlling the electric motor 20 based on the steering angle detected by the steering angle sensor 31 and the steering torque detected by the steering torque sensor 32.

[Configuration of Steering Torque Sensor]

Figure 2:
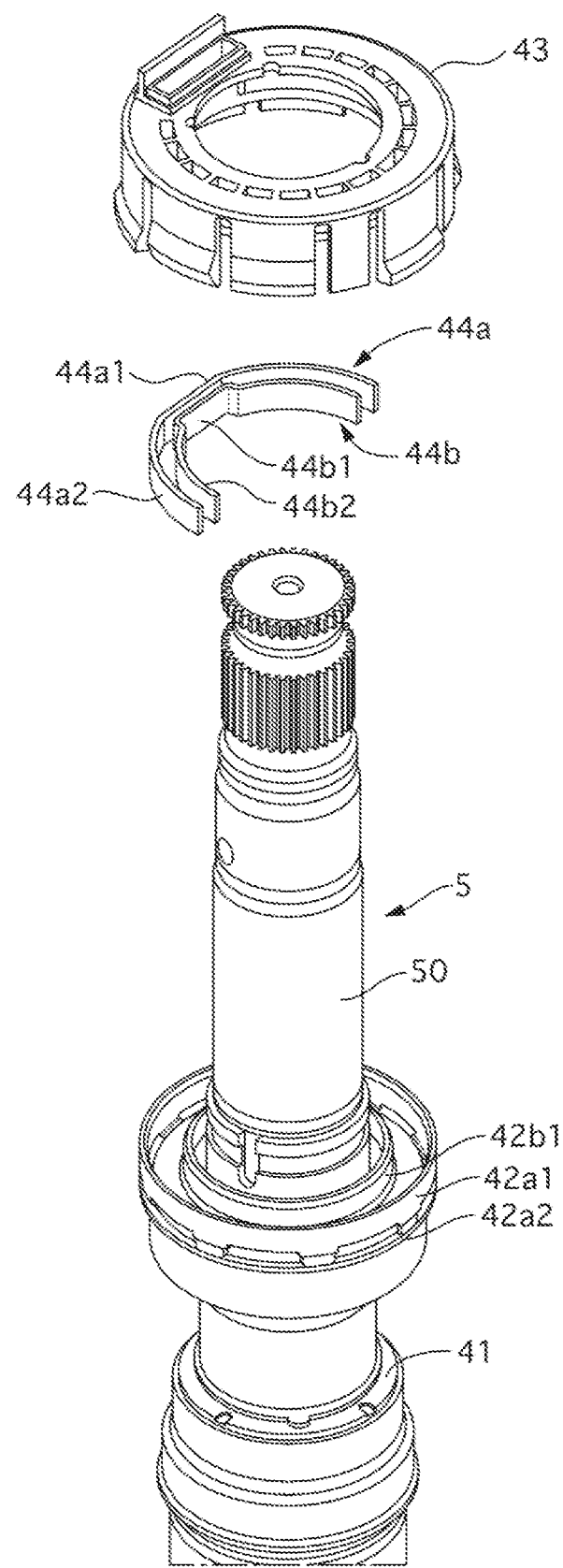
FIG. 2 is an exploded perspective view of a steering torque sensor according to the first embodiment.
Figure 3:
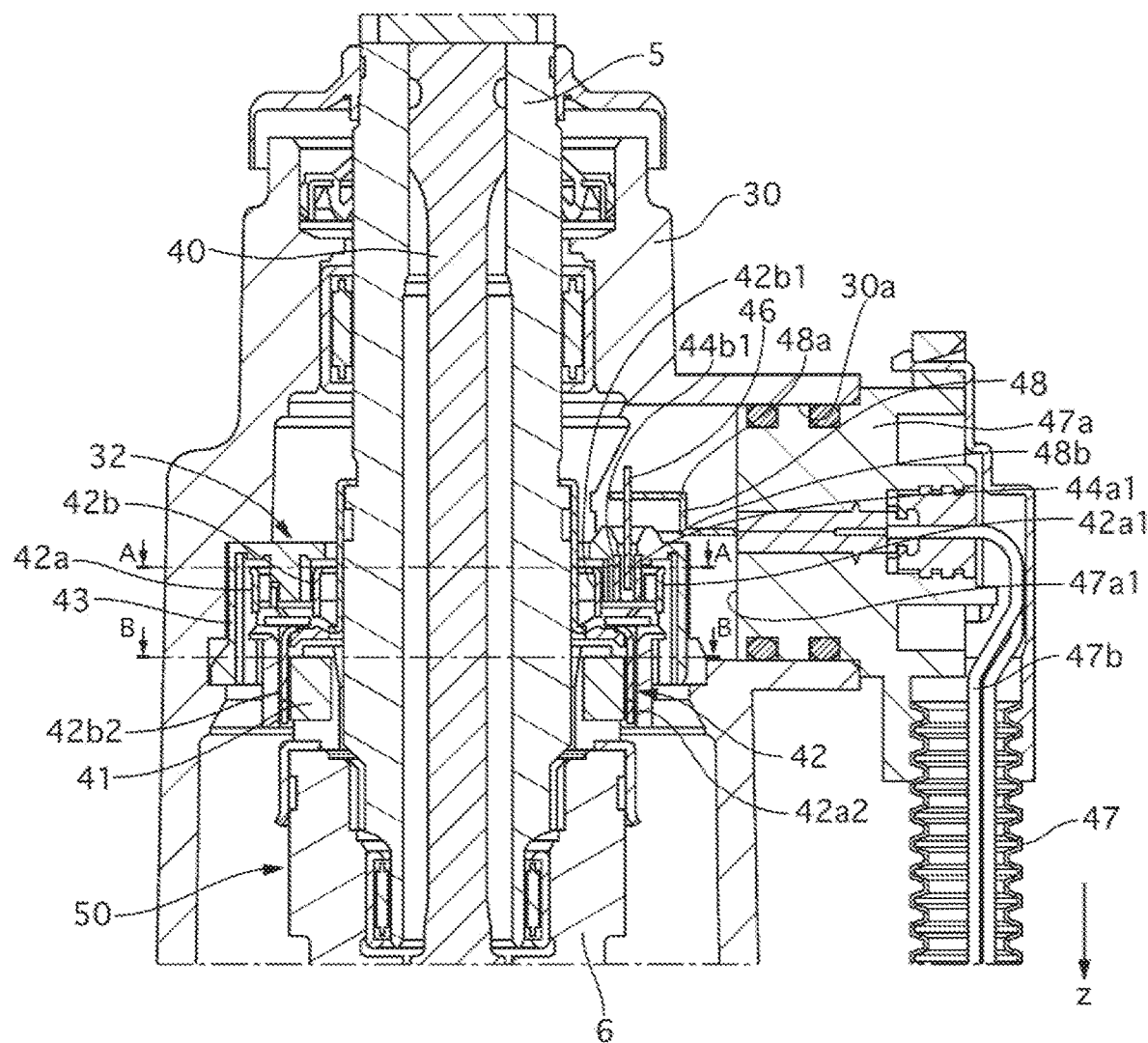
FIG. 3 is an axial cross-sectional view around the steering torque sensor according to the first embodiment.
Figure 4:
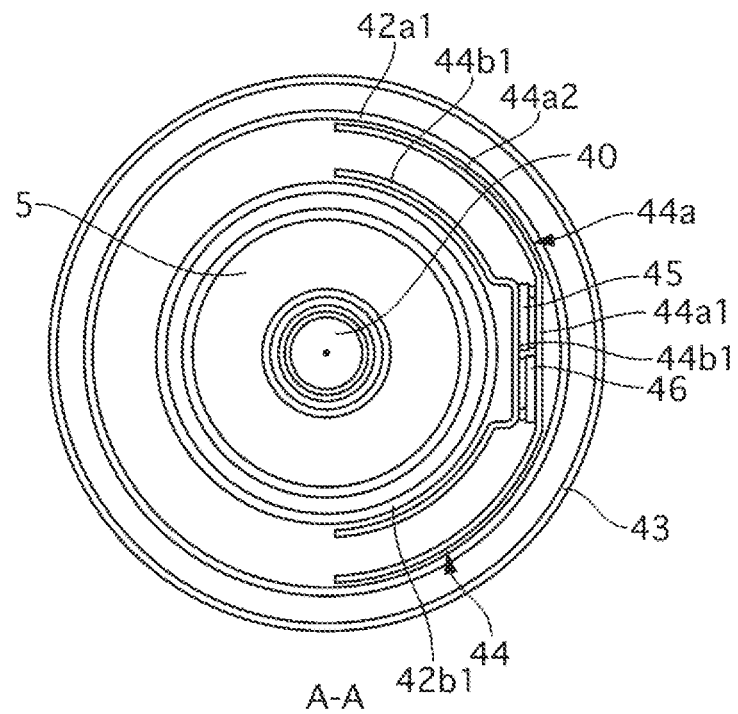
FIG. 4 is a radial cross-sectional view around the steering torque sensor according to the first embodiment.
Figure 5:
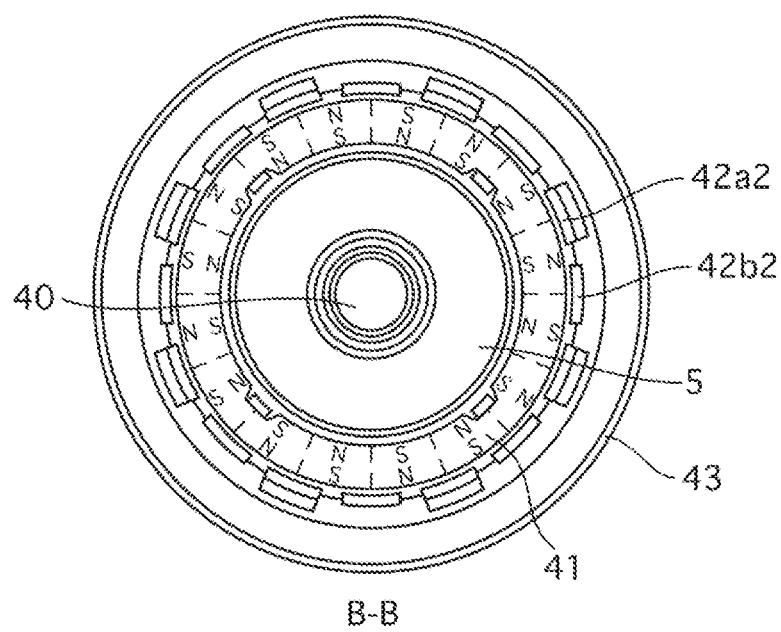
FIG. 5 is a radial cross-sectional view around the steering torque sensor according to the first embodiment.

FIG. 2 is an exploded perspective view around the steering torque sensor 32. FIG. 3 is an axial cross-sectional view around the steering torque sensor 32. FIG. 4 is a cross-sectional view taken along a line A-A illustrated in FIG. 2. FIG. 5 is a cross-sectional view taken along a line B-B illustrated in FIG. 2. As will be used in the following description, a Z-axis direction is defined to be a direction of a rotational axis of the rotational member 50 (the steering shaft 5 and the pinion shaft 6). The steering torque sensor 32 will be described, defining that a positive side and a negative side are one side where the pinion shaft 6 is located and the other side where the steering shaft 5 is located in the Z-axis direction, respectively.

The steering shaft 5 and the pinion shaft 6 are supported rotatably relative to each other in the sensor housing 30. The steering shaft 5 and the pinion shaft 6 are connected to each other via a torsion bar 40. One end side of the torsion bar 40 is fixed to the steering shaft 5. The other end side of the torsion bar 40 is fixed to the pinion shaft 6. When the steering torque is input, the torsion bar 40 is twisted, and a difference is generated between a rotational angle of the steering shaft 5 and a rotational angle of the pinion shaft 6. The steering torque sensor 32 calculates the steering torque from how large this difference is.

The steering torque sensor 32 includes a magnet 41, yoke member 42, a magnetic collection mechanism 44, and a magnetic sensor 45.

(Magnet)

The annularly formed magnet 41 is provided on one side of the steering shaft 5 that is closer to the pinion shaft 6, and at an outer periphery of the steering shaft 5. On the magnet 41, poles of a surface on an outer peripheral side thereof are arranged in such a manner that N poles and S poles are placed alternately in a circumferential direction. Eight N poles and eight S poles, i.e., sixteen poles in total are disposed on the surface of the magnet 41 on the outer peripheral side. The magnet 41 is supported by the pinion shaft 6, and rotates integrally with the pinion shaft 6.

(Yoke Member)

The yoke member 42 includes a first yoke member 42a and a second yoke member 42b.

The first yoke member 42a is made from a permalloy (a soft magnetic alloy). The first yoke member 42a includes a first annular portion 42a1 and first claw portions 42a2.

The first annular portion 42a1 is annularly formed. The steering shaft 5 is inserted in an inner periphery of the first annular portion 42a1.

The first claw portions 42a2 are each formed into a plate-like shape extending to a positive side of the first annular portion 42a1 in the Z-axis direction. The first claw portions 42a2 each extend from the first annular portion 42a1 to an inner peripheral side, and, after that, is bent to the positive side in the Z axis to extend therefrom. Eight first claw portions 42a2 are provided at approximately even intervals in the circumferential direction. The first claw portions 42a2 are formed in such a manner that the interval between the first claw portions 42a2 adjacent to each other in the circumferential direction is slightly larger than a width of one first claw portion 42a2 in the circumferential direction. The first claw portions 42a2 are formed in such a manner that a diameter of a circle defined by connecting inner peripheral surfaces of the first claw portions 42a2 in the circumferential direction is larger than an outer diameter of the magnet 41.

The second yoke member 42b is made from a permalloy. The second yoke member 42b includes a second annular portion 42b1 and second claw portions 42b2.

The second annular portion 42b1 is annularly formed. The steering shaft 5 is inserted in an inner periphery of the second annular portion 42b1. An outer peripheral surface of the second annular portion 42b1 faces an inner peripheral surface of the first annular portion 42a1 in the circumferential direction.

The second claw portions 42b2 are each formed into a plate-like shape extending to a positive side of the second annular portion 42b1 in the Z-axis direction. The second claw portions 42b2 each extend from the second annular portion 42b1 to an outer peripheral side, and, after that, is bent to the positive side in the Z axis to extend therefrom. Eight second claw portions 42b2 are provided at approximately even intervals in the circumferential direction. The second claw portions 42b2 are formed in such a manner that the interval between the second claw portions 42b2 adjacent to each other in the circumferential direction is slightly larger than a width of one second claw portion 42b2 in the circumferential direction. The second claw portions 42b2 are formed in such a manner that a diameter of a circle defined by connecting inner peripheral surfaces of the second claw portions 42b2 in the circumferential direction is larger than the outer diameter of the magnet 41.

The yoke member 42 is held in a yoke holder 43. The yoke member 42 is supported by the steering shaft 5 via the yoke holder 43, and rotates integrally with the steering shaft 5. The second annular portion 42b1 is inserted in the inner peripheral side of the first annular portion 42a1. The steering shaft 5 is inserted in the inner peripheral side of the second annular portion 42b1. The first annular portion 42a1 and the second annular portion 42b1 are disposed on the negative side in the Z-axis direction with respect to the magnet 41. The first claw portions 42a2 and the second claw portions 42b2 are disposed at an outer peripheral side of the magnet 41. The second claw portion 42b2 is disposed between the first claw portions 42a2 adjacent to each other. Without the steering torque input to the steering wheel 2, a center of the width of the first claw portion 42a2 in the circumferential direction and a center of the width of the second claw portion 42b2 in the circumferential direction are located at a position facing a boundary between the N pole and the S pole of the magnet 41.

(Magnetic Collection Mechanism)

The magnetic collection mechanism 44 includes a first magnetic collection mechanism 44a and a second magnetic collection mechanism 44b.

The first magnetic collection mechanism 44a is made from a permalloy. The first magnetic collection mechanism 44a is formed into an elongated plate-like shape curved in a circular-arc manner as a whole. The first magnetic collection mechanism 44a is formed in such a manner that an angle defined between both ends thereof matches approximately 180 degrees, when being viewed from the Z-axis direction. The first magnetic collection mechanism 44a includes a magnetic collection portion 44a1 and circular-arc portions 44a2. The magnetic collection portion 44a1 is formed into a rectangular plate-like shape. The circular-arc portions 44a2 are formed so as to extend in a circular-arc manner from both ends of the magnetic collection portion 44a1 in a longitudinal direction, respectively. When the first magnetic collection mechanism 44a is viewed from the Z-axis direction, the magnetic collection portion 44a1 is located on an inner peripheral side with respect to the circular-arc portion 44a2.

The second magnetic collection mechanism 44b is made from a permalloy. The second magnetic collection mechanism 44b is formed into an elongated plate-like shape curved in a circular-arc manner as a whole. The second magnetic collection mechanism 44b is formed in such a manner that an angle defined between both ends thereof matches approximately 180 degrees. The second magnetic collection mechanism 44b includes a magnetic collection portion 44b1 and circular-arc portions 44b2. The magnetic collection portion 44b1 is formed into a rectangular plate-like shape. The both end portions of the magnetic collection portion 44b1 in the longitudinal direction are bent generally perpendicularly to the longitudinal direction. The circular-arc portions 44b2 are each formed by extending in a circular-arc manner from a distal end of the bent portion of the magnetic collection portion 44b1. When the second magnetic collection mechanism 44b is viewed from the Z-axis direction, the circular-arc portions 44b2 are located on an outer peripheral side with respect to the magnetic collection portion 44b1.

The magnetic collection mechanism 44 is held in the yoke holder 43. The magnetic collection mechanism 44 is supported by the steering shaft 5 via the yoke holder 43, and rotates integrally with the steering shaft 5. When the magnetic collection mechanism 44 is viewed from the Z-axis direction, the first magnetic collection mechanism 44a and the second magnetic collection mechanism 44b are disposed on concentric circles centered at a rotational axis of the rotational member 50. The second magnetic collection mechanism 44b is disposed at the inner peripheral side of the first magnetic collection mechanism 44a. The first magnetic collection mechanism 44a and the second magnetic collection mechanism 44b are disposed in such a manner that the inner peripheral side of the magnetic collection portion 44a1 and the outer peripheral side of the magnetic collection portion 44b1 face each other. A distance between the magnetic collection portion 44a1 and the magnetic collection portion 44b1 is shorter than distances between the circular-arc portions 44a2 and the circular-arc portions 44b2.

The magnetic collection mechanism 44 is disposed between the first annular portion 42a1 of the first yoke member 42a and the second annular portion 42b1 of the second yoke member 42b. The first magnetic collection mechanism 44a is disposed in such a manner that the outer peripheral surface of the first magnetic collection mechanism 44a faces the inner peripheral surface of the first annular portion 42a1. The second magnetic collection mechanism 44b is disposed in such a manner that the inner peripheral surface of the second magnetic collection mechanism 44b faces the outer peripheral surface of the second annular portion 42b1.

(Magnetic Sensor)

Figure 6:
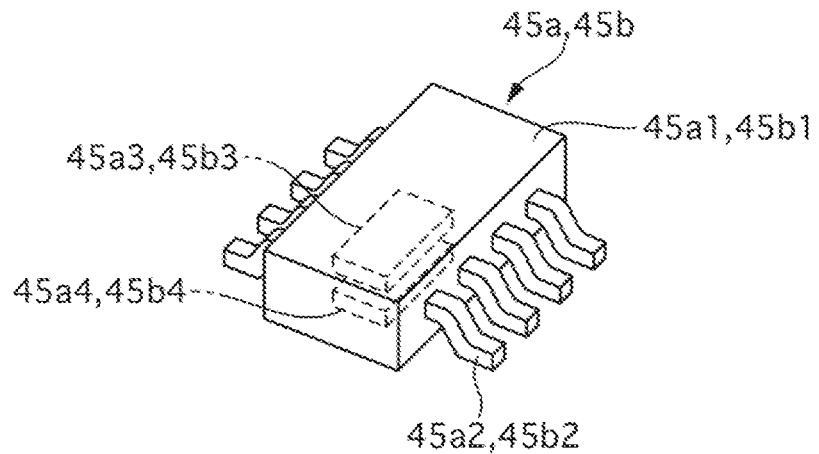
FIG. 6 is a schematic view of a magnetic sensor according to the first embodiment.

FIG. 6 is a schematic view of the magnetic sensor 45. The magnetic sensor 45 includes a first magnetic sensor 45a and a second magnetic sensor 45b. The first magnetic sensor 45a and the second magnetic sensor 45b are each a surface-mount IC including a Hall element therein.

The first magnetic sensor 45a and the second magnetic sensor 45b include main body portions 45a1 and 45b1, leads 45a2 and 45b2, first dies 45a3 and 45b3, and second dies 45a4 and 45b4, respectively. The first dies 45a3 and 45b3 and the second dies 45a4 and 45b4 each include a circuit containing a Hall element. The leads 45a2 and 45b2 are wired to the first dies 45a3 and 45b3 and the second dies 45a4 and 45b4, respectively. The main body portions 45a1 and 45*b*1 partially enclose the first dies 45*a*3 and 45*b*3, the second dies 45*a*4 and 45*b*4, and the leads 45*a*2 and 45*b*2 by resin molding, respectively. The main body portions 45*a*1 and 45*b*1 are each formed into a generally rectangular-column shape. The leads 45*a*2 and 45*b*2 extend from both side surfaces opposite from each other in a width direction of the main body portions 45*a*1 and 45*b*1, respectively. The first dies 45*a*3 and 45*b*3 and the second dies 45*a*4 and 45*b*4 are disposed side by side in thickness directions of the main body portions 45*a*1 and 45*b*1, respectively. Surfaces where the first dies 45*a*3 and 45*b*3 are provided, and surfaces where the second dies 45*a*4 and 45*b*4 are provided are defined to be front surfaces and back surfaces of the main body portions 45*a*1 and 45*b*1 of the first magnetic sensor 45*a* and the second magnetic sensor 45*b*, respectively.

Figure 7:
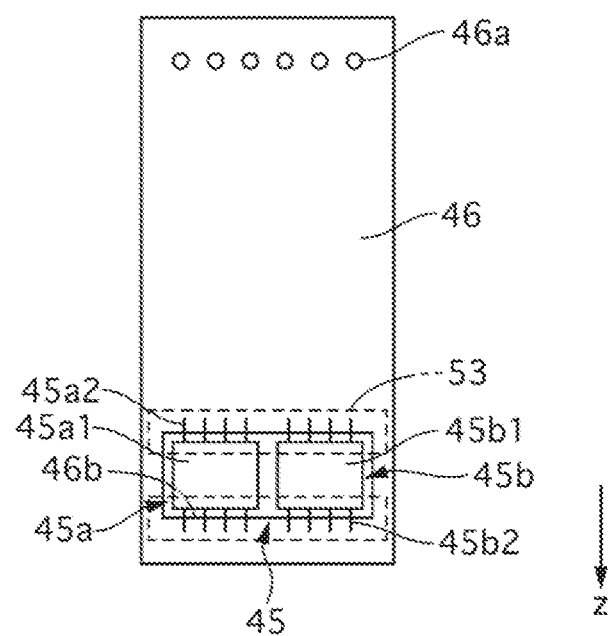
FIG. 7 is a schematic view of a substrate according to the first embodiment.

FIG. 7 is a schematic view of the substrate 46. The substrate 46 is formed into a rectangular plate-like shape. Six bus bar insertion holes 46*a* are formed on one side of the substrate 46 in a longitudinal direction. The bus bar insertion holes 46*a* are aligned on the same straight line extending in a width direction of the substrate 46. An opening portion 46*b* is formed on the other side of the substrate 46 in the longitudinal direction. The opening portion 46*b* is opened in a rectangular shape in which a long side thereof is disposed along the width direction of the substrate 46.

The first magnetic sensor 45*a* and the second magnetic sensor 45*b* are mounted on the substrate 46. The first magnetic sensor 45*a* and the second magnetic sensor 45*b* are mounted in such an orientation that the leads 45*a*2 and 45*b*2 extend in the direction of the long side of the substrate 46. The first magnetic sensor 45*a* and the second magnetic sensor 45*b* are disposed side by side in the width direction of the substrate 46 in the opening portion 46*b* of the substrate 46. The first magnetic sensor 45*a* and the second magnetic sensor 45*b* are disposed in such a manner that the front surfaces of the main body portions 45*a*1 and 45*b*1 are oriented in a thickness direction of the substrate 46 and the same directions as each other. Distal ends of the leads 45*a*2 and 45*b*2 are soldered on the same surface of the substrate 46. An insulating sheet 53 covering the leads 45*a*2 and 45*b*2 is attached to the substrate 46. A circuit connecting the bus bar insertion holes 46*a* and the leads 45*a*2 and 45*b*2 is formed on the substrate 46.

Figure 8:
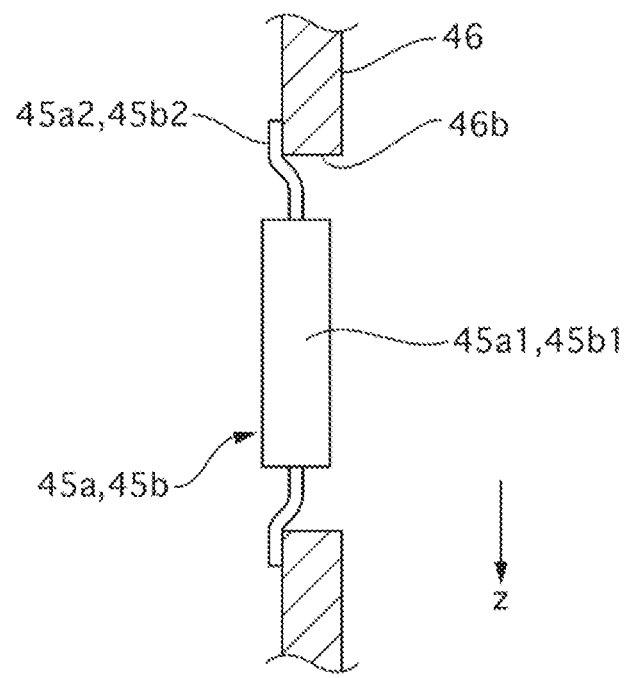
FIG. 8 is a schematic view of a partial cross section of the substrate according to the first embodiment taken along a longitudinal direction.

FIG. 8 is a schematic view of a partial cross section of the substrate 46 taken along the longitudinal direction. FIG. 8 illustrates the portion where the magnetic sensor 45 is mounted in an enlarged manner. The main body portions 45*a*1 and 45*b*1 are disposed so as to overlap the substrate 46 in the thickness direction.

The substrate 46 is connected to a bus bar 48 in each of the bus bar insertion holes 46*a*. The bus bar 48 is connected to a conductive wire 47*b* in a wire harness 47. The wire harness 47 is connected to a controller or a battery. The conductive wire 47*b* supplies power from the battery to the magnetic sensor 45. The conductive wire 47*b* is in charge of transmission and reception of a signal between the magnetic sensor 45 and the controller.

A connector 47*a* is provided at a distal end of the wire harness 47. The connector 47*a* is made from resin. A side surface 47*a*1 opposite from one side where the connector 47*a* is connected to the wire harness 47 is formed into a circular shape. Six bus bars 48 extend outward from the side surface 47*a*1. The bus bars 48 are arranged in alignment with one another on the same straight line passing through a center of the side surface 47*a*1. The bus bars 48 extend from the side surface 47*a*1 of the connector 47*a* in a direction generally perpendicular to the side surface 47*a*1. The bus bars 48 each include a first bent portion 48*a* bent in a direction generally perpendicular to the direction in which the bus bars 48 extend from the side surface 47*a*1 and in a direction generally perpendicular to the direction in which the six bus bars 48 are arranged. The bus bars 48 each include, on a distal end side with respect to the first bent portion 48*a*, a second bent portion 48*b* bent in a direction generally perpendicular to the direction in which the bus bars 48 extend from the first bent portions 48*a* and generally perpendicular to the direction in which the six bus bars 48 are arranged.

The connector 47*a* is attached in a through-hole 30*a* of the sensor housing 30 with distal ends of the bus bars 48 connected to the substrate 46. The through-hole 30*a* is formed on a side surface of the sensor housing 30. The through-hole 30*a* is formed so as to extend in a radial direction with respect to the Z-axis direction. An opening of the through-hole 30*a* is circular in cross section. The opening of the through-hole 30*a* is formed so as to have a diameter in cross section that is sized to allow the side surface 47*a*1 of the connector 47*a* to be inserted therein.

Figure 9:
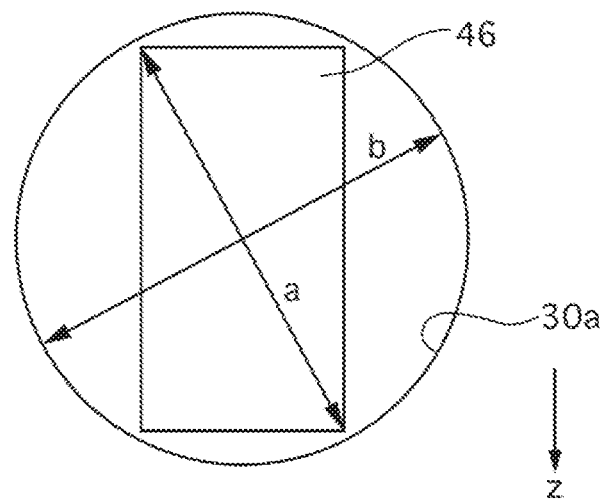
FIG. 9 is a schematic view illustrating a relationship between sizes of the substrate and a through-hole of a sensor housing according to the first embodiment.

FIG. 9 is a schematic view illustrating a relationship between sizes of the substrate 46 and the through-hole 30*a* of the sensor housing 30. The substrate 46 is inserted in the through-hole 30*a* together with the connector 47*a*. Therefore, the substrate 46 is formed in such a manner that a length a of a diagonal line thereof is smaller than a diameter b of the through-hole 30*a* of the sensor housing 30. The substrate 46 has the long side extending in a direction generally in parallel with the Z-axis direction of the rotational member 50 while one side of the substrate 46 where the bus bar insertion holes 46*a* are located is placed on the negative side in the Z-axis direction, with the connector 47*a* attached in the through-hole 30*a*.

After the connector 47*a* is attached in the through-hole 30*a*, the rotational member 50 with the magnet 41, the yoke member 42, the magnetic collection mechanism 44, and the like mounted thereon is inserted into the sensor housing 30 from the positive side in the Z-axis direction illustrated in FIG. 3. The magnetic sensor 45 is disposed between the magnetic collection portion 44*a*1 of the first magnetic collection mechanism 44*a* and the magnetic collection portion 44*b*1 of the second magnetic collection mechanism 44*b*. In the magnetic sensor 45, the direction in which the first dies 45*a*3 and the 45*b*3 and the second dies 45*a*4 and 45*b*4 are arranged coincides with a direction of a magnetic flux flowing between the magnetic collection portion 44*a*1 and the magnetic collection portion 44*b*1, with the magnetic sensor 45 disposed between the magnetic collection portion 44*a*1 and the magnetic collection portion 44*b*1.

[Circuit Configuration]

Figure 10:
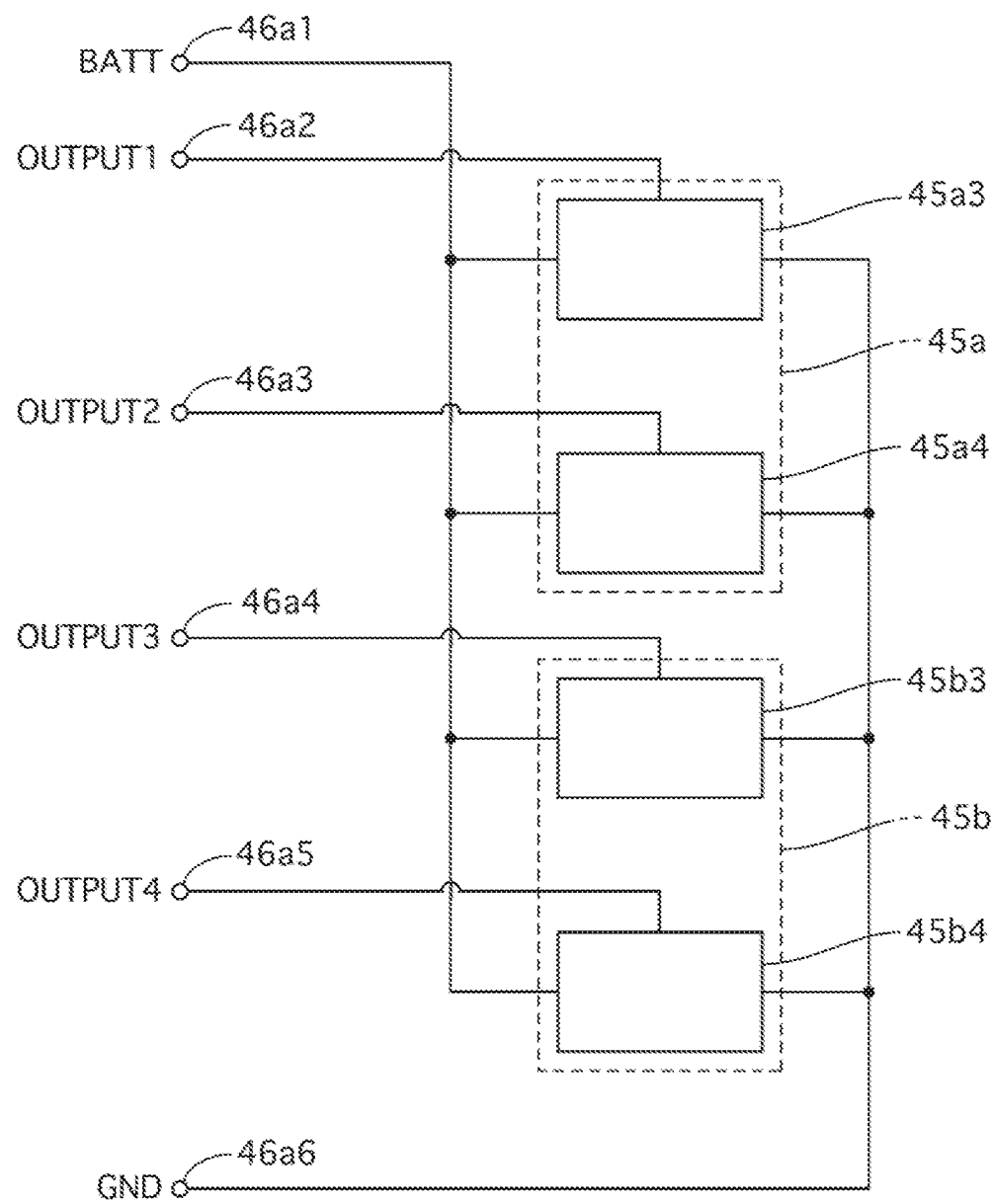
FIG. 10 illustrates a circuit configuration according to the first embodiment.

FIG. 10 illustrates a circuit configuration between the first magnetic sensor 45*a* and the second magnetic sensor 45*b*, and the bus bar insertion holes 46*a*. The bus bar insertion holes 46*a* include a first bus bar insertion hole 46*a*1, a second bus bar insertion hole 46*a*2, a third bus bar insertion hole 46*a*3, a fourth bus bar insertion hole 46*a*4, a fifth bus bar insertion hole 46*a*5, and a sixth bus bar insertion hole 46*a*6.

Power is input from the battery to the first bus bar insertion hole 46*a*1. The first bus bar insertion hole 46*a*1 is connected to power ports of the first dies 45*a*3 and 45*b*3 and the second dies 45*a*4 and 45*b*4 of the first magnetic sensor 45*a* and the second magnetic sensor 45*b*.

The second bus bar insertion hole 46*a*2 outputs a signal of the first die 45*a*3 of the first magnetic sensor 45*a*. The second bus bar insertion hole 46*a*2 is connected to a signal port of the first die 45*a*3 of the first magnetic sensor 45*a*.

The third bus bar insertion hole 46*a*3 outputs a signal of the second die 45*a*4 of the first magnetic sensor 45*a*. The third bus bar insertion hole 46*a*3 is connected to a signal port of the second die 45*a*4 of the first magnetic sensor 45*a*.

The fourth bus bar insertion hole 46*a*4 outputs a signal of the first die 45*b*3 of the second magnetic sensor 45*b*. The fourth bus bar insertion hole 46*a*4 is connected to a signal port of the first die 45*b*3 of the second magnetic sensor 45*b*.

The fifth bus bar insertion hole 46*a*5 outputs a signal of the second die 45*b*4 of the second magnetic sensor 45*b*. The fifth bus bar insertion hole 46*a*5 is connected to a signal port of the second die 45*b*4 of the second magnetic sensor 45*b*.

The sixth bus bar insertion hole 46*a*6 is grounded. The sixth bus bar insertion hole 46*a*6 is connected to ground ports of the first dies 45*a*3 and 45*b*3 and the second dies 45*a*4 and 45*b*4.

[Effects]

In the steering torque sensor 32 according to the first embodiment, the first magnetic collection mechanism 44*a* and the second magnetic collection mechanism 44*b* are disposed on the concentric circles centered at the rotational axis of the rotational member 50. Therefore, to place the magnetic sensor 45 between the magnetic collection portion 44*a*1 and the magnetic collection portion 44*b*1, the magnetic sensor 45 should be inserted into between the magnetic collection portion 44*a*1 and the magnetic collection portion 44*b*1 from the direction of the rotational axis of the rotational member 50. For this reason, the magnetic sensor 45 should be provided at a distal end of a member extending in the direction of the rotational axis of the rotational member 50.

Types of ICs of magnetic sensors include an insertion-mount type and a surface-mount type. Some of insertion-mount magnetic sensors have a relatively long lead. Use of such a magnetic sensor having the long lead allows the lead to extend from the substrate in the direction of the rotational axis and the magnetic sensor to be provided at a distal end of this lead. On the other hand, the leads 45*a*2 and 45*b*2 of the surface-mount magnetic sensor 45 are short compared to the lead of the insertion-mount magnetic sensor. Therefore, the leads cannot extend from the substrate 46 in the direction of the rotational axis.

Therefore, the steering torque sensor 32 according to the first embodiment is configured in such a manner that the first magnetic sensor 45*a* and the second magnetic sensor 45*b* are disposed between the magnetic collection portion 44*a*1 and the magnetic collection portion 44*b*1 together with the substrate 46, with the first magnetic sensor 45*a* and the second magnetic sensor 45*b* mounted on the substrate 46. Due to this configuration, the surface-mount first magnetic sensor 45*a* and second magnetic sensor 45*b* can be disposed by being inserted into between the magnetic collection portion 44*a*1 and the magnetic collection portion 44*b*1 in the direction of the rotational axis.

Further, the steering torque sensor 32 according to the first embodiment is configured in such a manner that the first magnetic sensor 45*a* and the second magnetic sensor 45*b* are disposed between the magnetic collection portion 44*a*1 and the magnetic collection portion 44*b*1. The distance between the magnetic collection portion 44*a*1 and the magnetic collection portion 44*b*1 is shorter than the distances between the circular-arc portions 44*a*2 and the circular-arc portions 44*b*2. As the distance between the first magnetic collection mechanism 44*a* and the second magnetic collection mechanism 44*b* reduces, magnetic resistance between the first magnetic collection mechanism 44*a* and the second magnetic collection mechanism 44*b* reduces. As the magnetic resistance reduces, a larger number of magnetic fluxes flow. As a result, the steering torque sensor 32 can improve accuracy of detecting a strength of a magnetic field by the first magnetic sensor 45*a* and the second magnetic sensor 45*b*.

Further, the steering torque sensor 32 according to the first embodiment is configured in such a manner that the six bus bars 48 are aligned on the same straight line passing through the center of the side surface 47*a*1 of the connector 47*a*. The bus bar insertion holes 46*a* of the substrate 46 are aligned on the same straight line. Aligning the bus bars 48 on the side surface 47*a*1 side on the same straight line allows the six bus bars 48 from the side surface 47*a*1 to the substrate 46 to have the same shapes as one another. The possible longest straight line acquired on the side surface 47*a*1 is the straight line passing through the center of the side surface 47*a*1. The present configuration allows the bus bars 48 adjacent to each other to be arranged at a wide interval compared to when the bus bars 48 are aligned on a straight line at another position of the side surface 47*a*1. Therefore, short-circuiting between the bus bars 48 can be prevented or reduced.

The opening of the through-hole 30*a* of the sensor housing 30 is formed so as to have the diameter in cross section that is sized to allow the side surface 47*a*1 of the connector 47*a* to be inserted therein. Therefore, the straight line passing through the center of the side surface 47*a*1 is a straight line passing through a center of the cross section of the opening of the through-hole 30*a*.

Further, the steering torque sensor 32 according to the first embodiment is configured in such a manner that each of the bus bars 48 includes the first bent portion 48*a* and the second bent portion 48*b* between the side surface 47*a*1 of the connector 47*a* and the substrate 46. The substrate 46 should be set to a size that allows the substrate 46 to pass through the through-hole 30*a* of the sensor housing 30 with the substrate 46 mounted on the connector 47*a*. The present configuration allows the bus bars 48 to be connected to the substrate 46 at positions offset from the central position of the side surface 47*a*1. The substrate 46 can have a long length in a long-side direction compared to when the substrate 46 is provided on the tips of the bus bars 48 extending from the side surface 47*a*1 in the straight line. The present configuration allows the steering torque sensor 32 to secure the distances between an end portion of the substrate 46 on the negative side in the Z-axis direction and the bus bars 48 mounted on the substrate 46. As a result, the steering torque sensor 32 can secure a large insertion margin used when the substrate 46 is inserted into between the first magnetic collection mechanism 44*a* and the second magnetic collection mechanism 44*b*.

The central position of the side surface 47*a*1 approximately coincides with the central position of the circular cross-section of the through-hole 30*a*.

Further, the steering torque sensor 32 according to the first embodiment is configured in such a manner that the main body portions 45*a*1 and 45*b*1 of the first magnetic sensor 45*a* and the second magnetic sensor 45*b* are disposed so as to overlap the substrate 46 in the thickness direction. This configuration allows the steering torque sensor 32 to have a thinner thickness for a portion where the first magnetic sensor 45*a* and the second magnetic sensor 45*b* are mounted compared when the main body portions 45*a*1 and 45*b*1 of the first magnetic sensor 45*a* and the second magnetic sensor 45*b* are disposed on the surface of the substrate 46. The steering torque sensor 32 can have a shorter distance between the magnetic collection portion 44a1 of the first magnetic collection mechanism 44a and the magnetic collection portion 44b1 of the second magnetic collection mechanism 44b. The present configuration allows the steering torque sensor 32 to have lower magnetic resistance between the magnetic collection portion 44a1 and the magnetic collection portion 44b1. As a result, the steering torque sensor 32 can improve the accuracy of detecting the strength of the magnetic field by the first magnetic sensor 45a and the second magnetic sensor 45b.

Further, the steering torque sensor 32 according to the first embodiment is configured in such a manner that the first magnetic sensor 45a and the second magnetic sensor 45b are disposed side by side in the width direction of the substrate 46 in the one opening portion 46b. The substrate 46 is not disposed between the first magnetic sensor 45a and the second magnetic sensor 45b. The present configuration allows the steering torque sensor 32 to have a short distance between the first magnetic sensor 45a and the second magnetic sensor 45b compared to when the substrate 46 is disposed between the first magnetic sensor 45a and the second magnetic sensor 45b. Therefore, the steering torque sensor 32 can achieve a reduction in a size of the substrate 46 in the width direction.

Further, the steering torque sensor 32 according to the first embodiment is configured in such a manner that the first magnetic sensor 45a and the second magnetic sensor 45b are mounted on the substrate 46 with the leads 45a2 and 45b2 extending in the longitudinal direction of the substrate 46. This configuration allows a region where the leads 45a2 and 45b2 are soldered onto the substrate 46 to be provided at an edge of the substrate 46 in the longitudinal direction with respect to the opening portion 46b. Therefore, the steering torque sensor 32 can achieve the reduction in the size of the substrate 46 in the width direction.

Further, the steering torque sensor 32 according to the first embodiment is configured in such a manner that the insulating sheet 53 covering the leads 45a2 and 45b2 is attached to the substrate 46 after the first magnetic sensor 45a and the second magnetic sensor 45b are mounted on the substrate 46. Due to this configuration, the steering torque sensor 32 can prevent or reduce occurrence of short-circuiting between the first magnetic sensor 45a and the second magnetic sensor 45b, and the first magnetic collection mechanism 44a and the second magnetic collection mechanism 44b.

Further, the steering torque sensor 32 according to the first embodiment is configured in such a manner that the first dies 45a3 and 45b3 and the second dies 45a4 and 45b4 of the first magnetic sensor 45a and the second magnetic sensor 45b are disposed side by side in the thickness directions of the main body portions 45a1 and 45b1. A direction of the magnetic flux between the magnetic collection portion 44a1 and the magnetic collection portion 44b1 coincides with the thickness direction of the main body portions 45a1 and 45b1, with the first magnetic sensor 45a and the second magnetic sensor 45b inserted into between the magnetic collection portion 44a1 of the first magnetic collection mechanism 44a and the magnetic collection portion 44b1 of the second magnetic collection mechanism 44b. The same magnetic flux lines pass through between the first die 45a3 and the second die 45a4, and between the first die 45b3 and the second die 45b4. As a result, the steering torque sensor 32 can detect strengths of the same magnetic fields on the first die 45a3 and the second die 45a4, and the first die 45b3 and the second die 45b4. Therefore, the steering torque sensor 32 can prevent or reduce errors in the detection of the strength of the magnetic field between the first die 45a3 and the second die 45a4 and between the first die 45b3 and the second die 45b4.

[Effects]

(1) The steering torque sensor 32 includes the rotational member 50 including the pinion shaft 6 (a first shaft) and the steering shaft 5 (a second shaft) connected to each other via the torsion bar 40; the magnet 41 provided at the pinion shaft 6 rotatably according to the rotation of the pinion shaft 6, annularly formed, and arranged in such a manner that the N pole and the S pole are disposed alternately in the circumferential direction; the first yoke member 42a provided at the steering shaft 5 rotatably according to the rotation of the steering shaft 5, made from the magnetic material, and including the first claw portions 42a2 (first claw portions), which are the plurality of plate-like members disposed so as to face the magnet 41, and the first annular portion 42a1 (a first annular portion) formed annularly and connecting the first claw portions 42a2 to one another; the second yoke member 42b provided at the steering shaft 5 rotatably according to the rotation of the steering shaft 5, made from the magnetic material, including the second claw portions 42b2 (second claw portions), which are the plurality of plate-like members disposed so as to face the magnet 41, and the second annular portion 42b1 (a second annular portion) formed annularly and connecting the second claw portions 42b2 to one another, and disposed in such a manner that each of the second claw portions 42b2 is disposed so as to be arranged alternately between the respective claw portions of the first claw portions 42a2; the first magnetic collection mechanism 44a (a first magnetic collection mechanism) provided so as to face the first annular portion 42a1 and be spaced apart from the first annular portion 42a1, and formed into the circular-arc shape along the direction around the rotational axis of the rotational member 50 with use of the magnetic material; the second magnetic collection mechanism 44b (a second magnetic collection mechanism) provided so as to face the second annular portion 42b1 and be spaced apart from the second annular portion 42b1, and formed into the circular-arc shape along the direction around the rotational axis of the rotational member 50 with use of the magnetic material; the surface-mount first magnetic sensor 45a (a first magnetic sensor) provided between the first magnetic collection mechanism 44a and the second magnetic collection mechanism 44b in the radial direction of the rotational axis of the rotational member 50 and including the Hall element configured to detect the magnetic field between the first magnetic collection mechanism 44a and the second magnetic collection mechanism 44b; the surface-mount second magnetic sensor 45b (a second magnetic sensor) provided between the first magnetic collection mechanism 44a and the second magnetic collection mechanism 44b in the radial direction of the rotational axis of the rotational member 50 and including the Hall element configured to detect the change in the magnetic field between the first magnetic collection mechanism 44a and the second magnetic collection mechanism 44b; and the substrate 46 (a sensor substrate) on which the first magnetic sensor 45a and the second magnetic sensor 45b are mounted. The steering torque sensor 32 detects the torque generated on the rotational member 50 based on the output signal of the first magnetic sensor 45a or the second magnetic sensor 45b.

Therefore, the surface-mount first magnetic sensor 45a and second magnetic sensor 45b can be disposed between the magnetic collection portion 44a1 and the magnetic collection portion 44b1 by being inserted in the direction of the rotational axis.

(2) The first magnetic sensor 45*a* and the second magnetic sensor 45*b* are provided at the region where the magnetic resistance is minimized, in the region between the first magnetic collection mechanism 44*a* and the second magnetic collection mechanism 44*b*.

Therefore, the steering torque sensor 32 can improve the accuracy of detecting the strength of the magnetic field by the first magnetic sensor 45*a* and the second magnetic sensor 45*b*.

(3) The steering torque sensor 32 further includes the sensor housing 30 containing the first yoke member 42*a*, the second yoke member 42*b*, the first magnetic collection mechanism 44*a*, the second magnetic collection mechanism 44*b*, the first magnetic sensor 45*a*, the second magnetic sensor 45*b*, and the substrate 46, and including the through-hole 30*a* (a connector insertion hole) extending in the radial direction of the rotational axis of the rotational member 50; the wire harness 47 (a sensor harness) configured to output the detection signals of the first magnetic sensor 45*a* and the second magnetic sensor 45*b* to outside the sensor housing 30; the connector 47*a* (a connector portion) inserted in the through-hole 30*a* and configured to fix the wire harness 47 to the sensor housing 30; and the bus bar 48 (a connection terminal) connecting the wire harness 47 and the substrate 46. The substrate 46 is provided in such a manner that the mount surface extends generally in parallel with the rotational axis of the rotational member 50. The through-hole 30*a* is formed in such a manner that the cross section thereof perpendicular to the radial direction of the rotational axis of the rotational member 50 is generally circular, and that the diameter of the circular cross section is larger than the longest dimension of the substrate 46. The bus bar 48 includes the first bent portion 48*a* and the second bent portion 48*b* (a bent portion) which are bent between the wire harness 47 side and the substrate 46 side so as to be connected to the substrate 46 at the position that passes through the generally central portion of the circular cross section of the through-hole 30*a* on the wire harness 47 side and is offset from the generally central portion of the circular cross section on the substrate 46 side.

Therefore, the steering torque sensor 32 can secure the large insertion margin used when the substrate 46 is inserted into the magnetic collection portion 44*a*1 of the first magnetic collection mechanism 44*a* and the magnetic collection portion 44*b*1 of the second magnetic collection mechanism 44*b*.

(4) The first magnetic sensor 45*a* and the second magnetic sensor 45*b* are provided so as to overlap the substrate 46 in the direction of the thickness of the substrate 46.

Therefore, the steering torque sensor 32 can improve the accuracy of detecting the strength of the magnetic field by the first magnetic sensor 45*a* and the second magnetic sensor 45*b*.

(5) The substrate 46 includes the opening portion 46*b* (a sensor substrate cutout portion), which is the cutout portion provided in the region overlapping the first magnetic sensor 45*a* and the second magnetic sensor 45*b* in the direction of the rotational axis and in the direction around the rotational axis of the rotational member 50. The first magnetic sensor 45*a* and the second magnetic sensor 45*b* are provided so as to be located adjacent to each other in the direction around the rotational axis.

Therefore, the steering torque sensor 32 can achieve the reduction in the size of the substrate 46 in the width direction.

(6) The substrate 46 is provided in such a manner that the mount surface extends generally in parallel with the rotational axis of the rotational member. The first magnetic sensor 45*a* and the second magnetic sensor 45*b* are connected to the substrate 46 in such a manner that each of the lead 45*a*2 of the first magnetic sensor 45*a* and the lead 45*b*2 of the second magnetic sensor 45*b* extends in the direction of the rotational axis of the rotational member 50.

Therefore, the steering torque sensor 32 can achieve the reduction in the size of the substrate 46 in the width direction.

(7) The steering torque sensor 32 further includes the insulating sheet 53 (a cover member) made from the insulating material and configured to surround the lead 45*a*2 of the first magnetic sensor 45*a* and the lead 45*b*2 of the second magnetic sensor 45*b*.

Therefore, the steering torque sensor 32 can prevent or reduce occurrence of short-circuiting between the first magnetic sensor 45*a* and the second magnetic sensor 45*b* and the first magnetic collection mechanism 44*a* and the second magnetic collection mechanism 44*b*.

(8) The first die 45*a*3 (the first magnetic sensor) and the second die 45*a*4 (the second magnetic sensor) are disposed on the same magnetic field.

Therefore, the steering torques sensor 32 can prevent or reduce errors in the detection of the strength of the magnetic field detected by the first die 45*a*3 and the second die 45*a*4.

Second Embodiment

A steering torque sensor 32 according to a second embodiment will be described. The steering torque sensor 32 according to the second embodiment is different from the steering torque sensor 32 according to the first embodiment in terms of the shape of the substrate 46 and the position on the substrate 46 where the magnetic sensor 45 is mounted. In the following description, similar configurations to the first embodiment will not be described.

Figure 11:
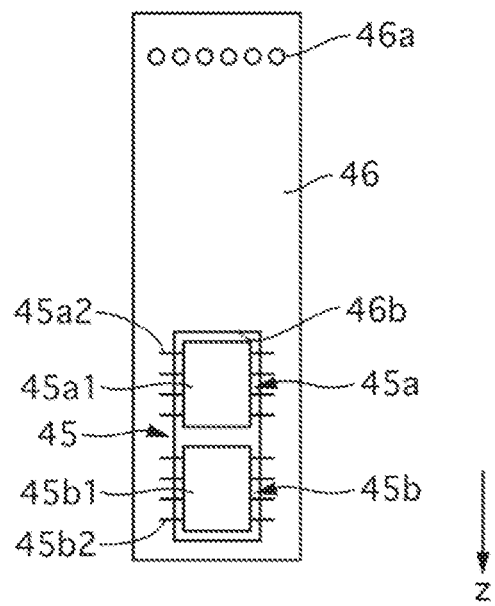
FIG. 11 is a schematic view of a substrate according to a second embodiment.

FIG. 11 is a schematic view of the substrate 46. The substrate 46 is formed into a rectangular plate-like shape. The six bus bar insertion holes 46*a* are formed on the one side of the substrate 46 in the longitudinal direction. The bus bar insertion holes 46*a* are formed on the same straight line extending in the width direction of the substrate 46. The rectangular opening portion 46*b*, in which the long side thereof is disposed along the longitudinal direction of the substrate 46, is formed on the other side of the substrate 46 in the longitudinal direction.

The first magnetic sensor 45*a* and the second magnetic sensor 45*b* are mounted on the substrate 46. The first magnetic sensor 45*a* and the second magnetic sensor 45*b* are mounted in such an orientation that the leads 45*a*2 and 45*b*2 extend in the width direction of the substrate 46. The first magnetic sensor 45*a* and the second magnetic sensor 45*b* are disposed side by side in the longitudinal direction of the substrate 46 in the opening portion 46*b* of the substrate 46. The distal ends of the leads 45*a*2 and 45*b*2 are soldered on the same surface of the substrate 46. The circuit connecting the bus bar insertion holes 46*a* and the leads 45*a*2 and 45*b*2 is formed on the substrate 46.

[Functions]

The steering torque sensor 32 according to the second embodiment is configured in such a manner that the first magnetic sensor 45*a* and the second magnetic sensor 45*b* are disposed side by side in the longitudinal direction of the substrate 46 in the opening portion 46*b* of the substrate 46. The present configuration allows the steering torque sensor 32 to have a small region of the substrate 46 in the width direction where the first magnetic sensor 45*a* and the second magnetic sensor 45b occupy compared to when the first magnetic sensor 45a and the second magnetic sensor 45b are arranged in the width direction of the substrate 46. Therefore, the steering torque sensor 32 can achieve a reduction in the size of the substrate 46 in the width direction.

[Effects]

(9) The first magnetic sensor 45a and the second magnetic sensor 45b are disposed so as to be arranged in series in the direction of the rotational axis of the rotational member 50.

Therefore, the steering torque sensor 32 can achieve the reduction in the size of the substrate 46 in the width direction.

Third Embodiment

A steering torque sensor 32 according to a third embodiment will be described. The steering torque sensor 32 according to the third embodiment is different from the steering torque sensor 32 according to the first embodiment in terms of the position on the substrate 46 where the magnetic sensor 45 is mounted. In the following description, similar configurations to the first embodiment will not be described.

Figure 12:
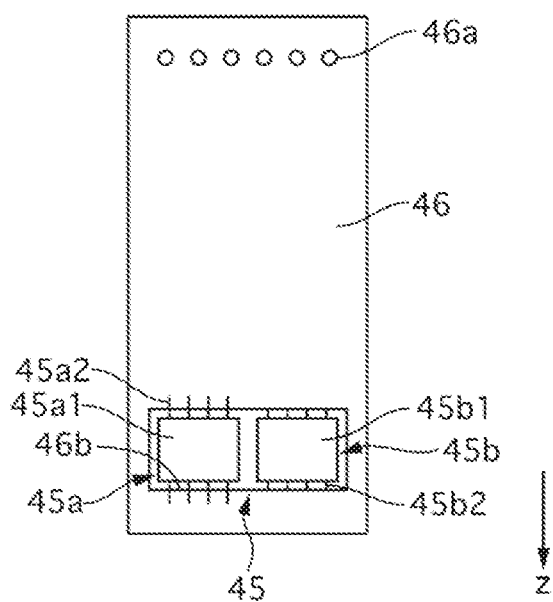
FIG. 12 is a schematic view of a substrate according to a third embodiment.

FIG. 12 is a schematic view of the substrate 46. The substrate 46 is formed into a rectangular plate-like shape. The six bus bar insertion holes 46a are formed on the one side of the substrate 46 in the longitudinal direction. The bus bar insertion holes 46a are formed on the same straight line extending in the width direction of the substrate 46. The rectangular opening portion 46b, in which the long side thereof is disposed along the longitudinal direction of the substrate 46, is formed on the other side of the substrate 46 in the width direction.

The first magnetic sensor 45a and the second magnetic sensor 45b are mounted on the substrate 46. The first magnetic sensor 45a and the second magnetic sensor 45b are mounted in such an orientation that the leads 45a2 and 45b2 extend in the long-side direction of the substrate 46. The first magnetic sensor 45a and the second magnetic sensor 45b are disposed side by side in the width direction of the substrate 46 in the opening portion 46b of the substrate 46. The first magnetic sensor 45a and the second magnetic sensor 45b are disposed in such a manner that the front surfaces of the main body portions 45a1 and 45b1 are oriented in the thickness direction of the substrate 46 and opposite directions from each other. The distal end of the lead 45a2 is soldered on one surface of the substrate 46. The distal end of the lead 45b2 is soldered on the other surface of the substrate 46. The circuit connecting the bus bar insertion holes 46a and the leads 45a2 and 45b2 is formed on the substrate 46.

Figure 13:
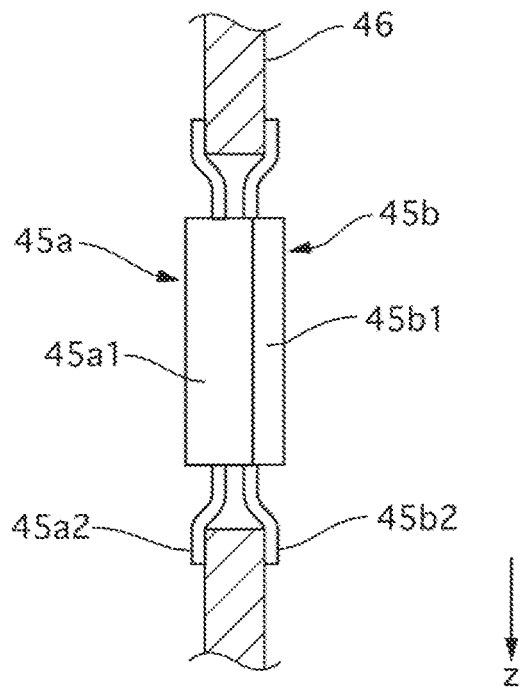
FIG. 13 is a schematic view of a partial cross section of the substrate according to the third embodiment taken along the longitudinal direction.

FIG. 13 is a schematic view of a partial cross section of the substrate 46 taken along the longitudinal direction. FIG. 13 illustrates the portion where the magnetic sensor 45 is mounted in an enlarged manner. The main body portions 45a1 and 45b1 are disposed so as to overlap the substrate 46 in the thickness direction.

[Functions]

The steering torque sensor 32 according to the third embodiment is configured in such a manner that the first magnetic sensor 45a and the second magnetic sensor 45b are disposed on the substrate 46 with the front surfaces thereof facing opposite directions from each other. The plus or minus sign of the signal output from the magnetic sensor 45 is inverted between when the magnetic flux passes from the front surface to the back surface of the magnetic sensor 45 and when the magnetic flux passes from the back surface to the front surface of the magnetic sensor 45. As a result, the steering torque sensor 32 can acquire signals having opposite plus and minus signs from each other from the first magnetic sensor 45a and the second magnetic sensor 45b.

[Effects]

(10) The first magnetic sensor 45a and the second magnetic sensor 45b are mounted on the substrate 46 in such a manner that the front and back sides thereof face opposite from each other.

Therefore, the steering torque sensor 32 can acquire the signals having opposite plus and minus signs from each other from the first magnetic sensor 45a and the second magnetic sensor 45b.

Fourth Embodiment

A steering torque sensor 32 according to a fourth embodiment will be described. The steering torque sensor 32 according to the fourth embodiment is different from the steering torque sensor 32 according to the first embodiment in terms of a method for connecting the substrate 46 and the connector 47a. In the following description, similar configurations to the first embodiment will not be described.

Figure 14:
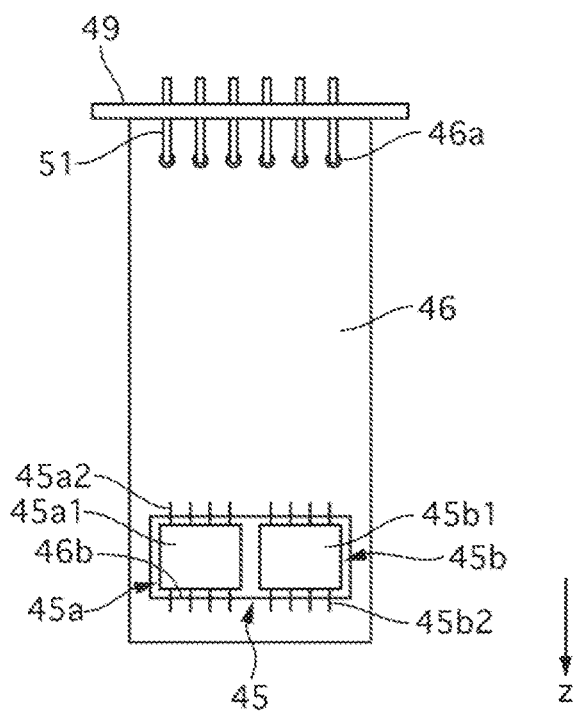
FIG. 14 is a schematic view of a substrate according to a fourth embodiment.
Figure 15:
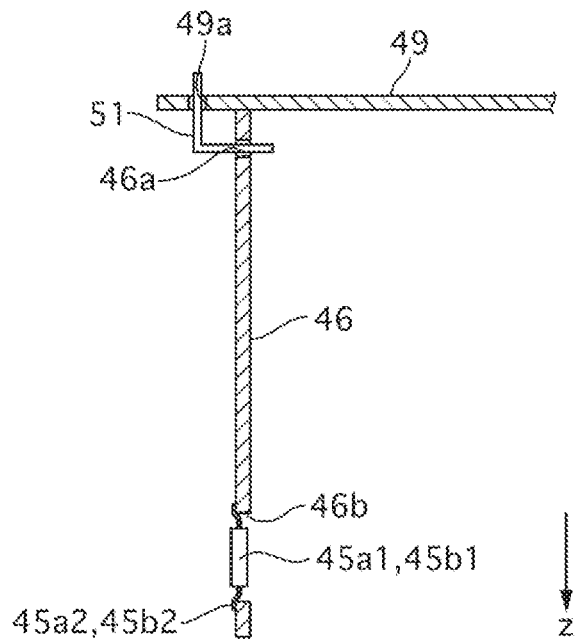
FIG. 15 is a schematic view of a cross section of the substrate according to the fourth embodiment taken along the longitudinal direction.

FIG. 14 is a schematic view of the substrate 46 and a substrate 49. FIG. 15 is a schematic view of cross sections of the substrate 46 and the substrate 49 taken along the longitudinal direction of the substrate 46. The substrate 49 is a generally rectangular plate-like member. The substrate 49 is attached to the side surface 47a1 of the connector 47a. The substrate 49 is connected to the conductive wire 47b in the wire harness 47. A longitudinal direction of the substrate 49 extends in the direction generally perpendicular to the side surface 47a1.

Bus bar insertion holes 49a are formed on an end portion of the substrate 49 opposite from the connector 47a. A circuit connecting the bus bar insertion holes 49a and the conductive wire 47b in the wire harness 47 is formed on the substrate 49. The bus bar insertion holes 49a are aligned on the straight line extending in a width direction of the substrate 49. The substrate 46 is attached at a position closer to the connector 47a than the bus bar insertion hole 49a of the substrate 49 is. The width direction of the substrate 46 extends generally in parallel with the width direction of the substrate 49. The longitudinal direction of the substrate 46 extends generally perpendicularly to the longitudinal direction of the substrate 49. The bus bar insertion holes 46a of the substrate 46 are connected to the bus bar insertion holes 49a of the substrate 49 via bus bars 51.

[Functions]

In the steering torque sensor 32 according to the fourth embodiment, the substrate 49 is provided on the side surface 47a1 of the connector 47a. The substrate 49 is arranged in such a manner that the longitudinal direction thereof extends generally perpendicularly to the side surface 47a1. The longitudinal direction of the substrate 49 extends generally perpendicularly to the Z-axis direction with the connector 47a attached to the sensor housing 30. The longitudinal direction of the substrate 46 generally coincides with the Z-axis direction with the connector 47a attached to the sensor housing 30.

The present configuration allows an electronic component other than the magnetic sensor 45 to be mounted on the substrate 49 side. This eliminates a necessity of mounting an electronic component other than the magnetic sensor 45 on the substrate 46. The substrate 49 does not have to be inserted into between the magnetic collection portion 44a1 of the first magnetic collection mechanism 44a and the magnetic collection portion 44b1 of the second magnetic collection mechanism 44b. Therefore, the present configuration can ease limitation imposed on the thickness of the entire substrate 49 including an electronic component disposed on the substrate 49 compared to the substrate 46. Therefore, the steering torque sensor 32 can improve design flexibility of the circuits on the substrate 46 and the substrate 49.

[Effects]

(11) The steering torque sensor 32 further includes the substrate 49 (a second sensor substrate) provided in such a manner that the mount surface extends generally perpendicularly to the rotational axis of the rotational member. The substrate 46 is provided so as to extend from the substrate 49 in the direction of the rotational axis of the rotational member 50.

Therefore, the steering torque sensor 32 can improve the design flexibility of the circuits on the substrate 46 and the substrate 49.

Fifth Embodiment

A steering torque sensor 32 according to a fifth embodiment will be described. The steering torque sensor 32 according to the fifth embodiment is different from the steering torque sensor 32 according to the first embodiment in terms of the method for connecting the substrate 46 and the connector 47a. In the following description, similar configurations to the first embodiment will not be described.

Figure 16:
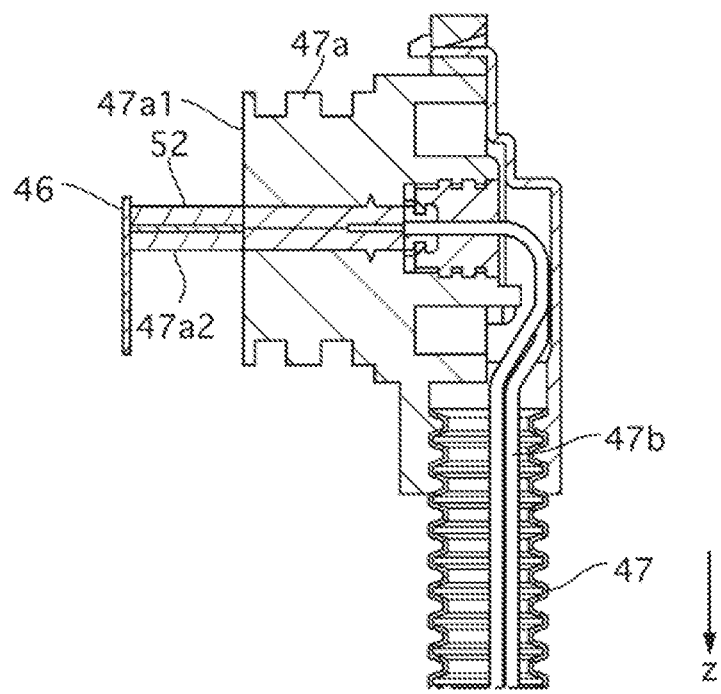
FIG. 16 is a schematic view of a portion where the substrate and a connector are connected to each other according to a fifth embodiment.

FIG. 16 is a schematic view of a portion where the substrate 46 and the connector 47a are connected to each other. The connector 47a includes a protrusion portion 47a2 protruding from the side surface 47a1. The protrusion portion 47a2 is molded integrally together with the connector 47a with use of resin. A bus bar 52 is molded in the protrusion portion 47a2. The bus bar 52 is connected to the conductive wire 47b in the wire harness 47. The protrusion portion 47a2 extends in the direction generally perpendicular to the side surface 47a1. The substrate 46 is attached at a tip of the protrusion portion 47a2. The longitudinal direction of the substrate 46 extends in a direction generally perpendicular to a direction in which the protrusion portion 47a2 extends. The circuit in the substrate 46 is connected to the bus bar 52.

[Functions]

The steering torque sensor 32 according to the fifth embodiment is configured in such a manner that the substrate 46 is attached to the connector 47a. This configuration allows the substrate 46 to be directly connected to the connector 47a without another member disposed between the substrate 46 and the connector 47a. As a result, the steering torque sensor 32 can achieve a reduction in the number of components. Further, the steering torque sensor 32 can achieve enhancement of an assembling strength between the substrate 46 and the connector 47a.

[Effects]

(12) The steering torque sensor 32 includes the sensor housing 30 containing the first yoke member 42a, the second yoke member 42b, the first magnetic collection mechanism 44a, the second magnetic collection mechanism 44b, the first magnetic sensor 45a, the second magnetic sensor 45b, and the substrate 46, and including the through-hole 30a extending in the radial direction of the rotational axis of the rotational member 50; the wire harness 47 configured to output the detection signals of the first magnetic sensor 45a and the second magnetic sensor 45b to outside the sensor housing 30; the connector 47a inserted in the through-hole 30a and configured to fix the wire harness 47 to the sensor housing 30; and the bus bar 52 (a connection terminal) connecting the wire harness 47 and the substrate 46. The substrate 46 is formed integrally with the connector 47a.

Therefore, the steering torque sensor 32 can achieve the reduction in the number of components. Further, the steering torque sensor 32 can achieve the enhancement of the assembling strength between the substrate 46 and the connector 47a.

Sixth Embodiment

A steering torque sensor 32 according to a sixth embodiment will be described. The steering torque sensor 32 according to the sixth embodiment is different from the steering torque sensor 32 according to the first embodiment in terms of the structure of the magnetic collection mechanism 44. In the following description, similar configurations to the first embodiment will not be described.

Figure 17:
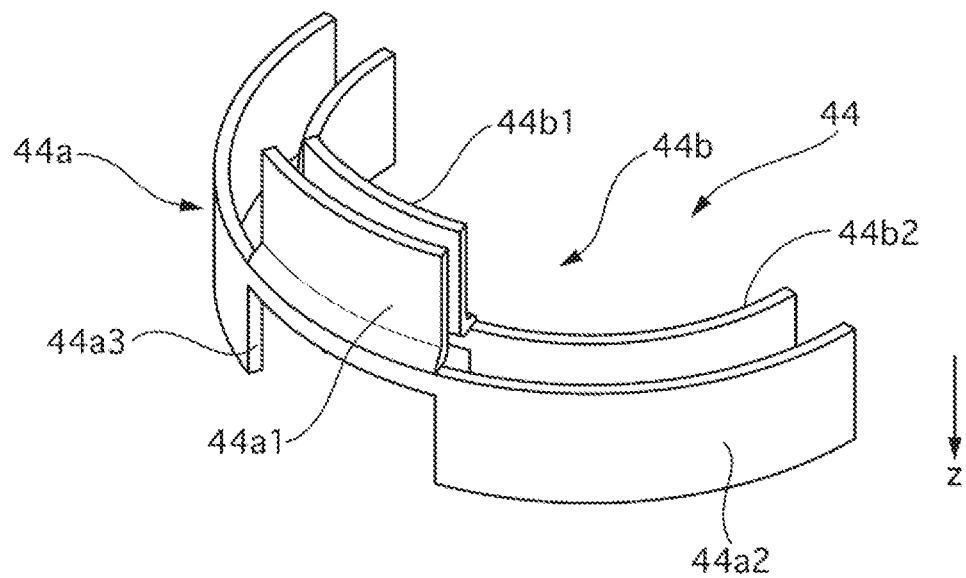
FIG. 17 is a perspective view of magnetic collection mechanisms according to a sixth embodiment.
Figure 18:
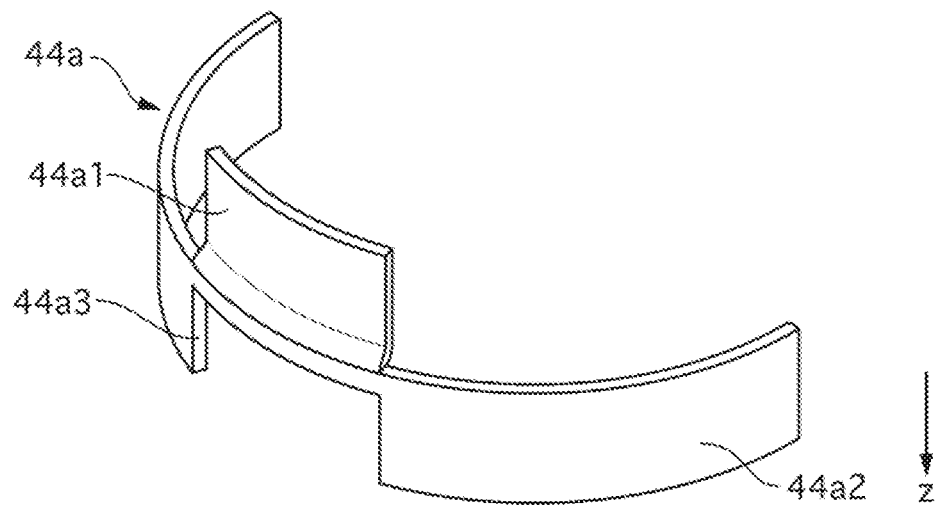
FIG. 18 is a perspective view of a first magnetic collection mechanism according to the sixth embodiment.
Figure 19:
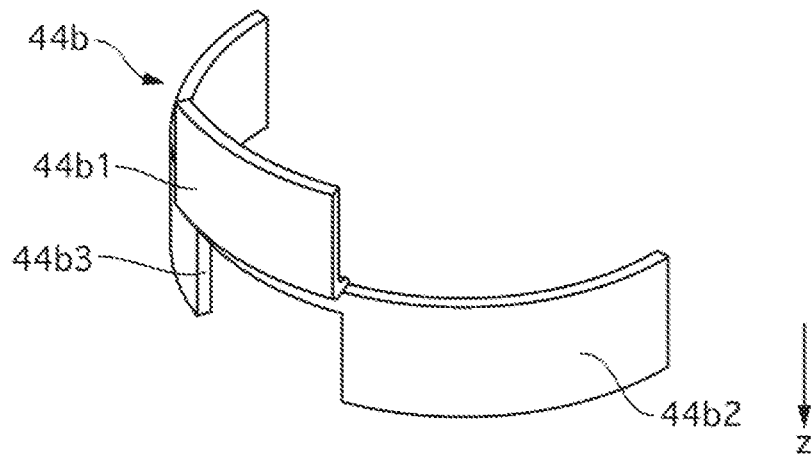
FIG. 19 is a perspective view of a second magnetic collection mechanism according to the sixth embodiment.

FIG. 17 is a perspective view of the magnetic collection mechanism 44. FIG. 18 is a perspective view of the first magnetic collection mechanism 44a. FIG. 19 is a perspective view of the second magnetic collection mechanism 44b.

The first magnetic collection mechanism 44a is formed into a plate-like shape curved in a circular-arc manner as a whole. The first magnetic collection mechanism 44a is formed in such a manner that the angle defined between both the ends thereof matches approximately 180 degrees, when being viewed from the Z-axis direction. The first magnetic collection mechanism 44a includes the magnetic collection portion 44a1 and the circular-arc portions 44a2. The magnetic collection portion 44a1 protrudes toward the negative side in the Z-axis direction with respect to the circular-arc portions 44a2. A cutout portion 44a3 is formed on a positive side of the magnetic collection portion 44a1 in the Z-axis direction. When the first magnetic collection mechanism 44a is viewed from the Z-axis direction, the circular-arc portions 44a2 are formed so as to extend in a circular-arc manner from both end portions of the cutout portion 44a3. When the first magnetic collection mechanism 44a is viewed from the Z-axis direction, the magnetic collection portion 44a1 is located on the inner peripheral side with respect to the circular-arc portions 44a2.

The second magnetic collection mechanism 44b is formed into a plate-like shape curved in a circular-arc manner as a whole. The second magnetic collection mechanism 44b is formed in such a manner that the angle defined between both the ends thereof matches approximately 180 degrees, when being viewed from the Z-axis direction. The second magnetic collection mechanism 44b includes the magnetic collection portion 44b1 and the circular-arc portions 44b2. The magnetic collection portion 44b1 protrudes toward the negative side in the Z-axis direction with respect to the circular-arc portions 44b2. A cutout portion 44b3 is formed on a positive side of the magnetic collection portion 44b1 in the Z-axis direction. When the second magnetic collection mechanism 44b is viewed from the Z-axis direction, the circular-arc portions 44b2 are formed so as to extend in a circular-arc manner from both end portions of the cutout portion 44b3. When the second magnetic collection mechanism 44b is viewed from the Z-axis direction, the magnetic collection portion 44b1 is located on the outer peripheral side with respect to the circular-arc portions 44b2.

The magnetic collection mechanism 44 is held in the yoke holder 43. When the magnetic collection mechanism 44 is viewed from the Z-axis direction, the first magnetic collection mechanism 44a and the second magnetic collection mechanism 44b are disposed on concentric circles centered at the rotational axis of the rotational member 50. The second magnetic collection mechanism 44b is disposed on the inner peripheral side of the first magnetic collection mechanism 44a. The first magnetic collection mechanism 44a and the second magnetic collection mechanism 44b are disposed in such a manner that the inner peripheral side of the magnetic collection portion 44a1 and the outer peripheral side of the magnetic collection portion 44b1 face each other. The distance between the magnetic collection portion 44a1 and the magnetic collection portion 44b1 is shorter than the distances between the circular-arc portions 44a2 and the circular-arc portions 44b2.

The magnetic collection mechanism 44 is disposed between the first annular portion 42a1 of the first yoke member 42a and the second annular portion 42b1 of the second yoke member 42b. The first magnetic collection mechanism 44a is disposed in such a manner that the outer peripheral surface of the first magnetic collection mechanism 44a faces the inner peripheral surface of the first annular portion 42a1. The second magnetic collection mechanism 44b is disposed in such a manner that the inner peripheral surface of the second magnetic collection mechanism 44b faces the outer peripheral surface of the second annular portion 42b1.

[Functions]

In the steering torque sensor 32 according to the sixth embodiment, the circular-arc portions 44a2 of the first magnetic collection mechanism 44a are provided so as to overlap the first annular portion 42a1 of the first yoke member 42a in the Z-axis direction. Further, the magnetic collection portion 44a1 is provided so as to protrude toward the negative side in the Z-axis direction with respect to the circular-arc portions 44a2. Further, the circular-arc portions 44b2 of the second magnetic collection mechanism 44b are provided so as to overlap the second annular portion 42b1 of the second yoke member 42b in the Z-axis direction. Further, the magnetic collection portion 44b1 is provided so as to protrude toward the negative side in the Z-axis direction with respect to the circular-arc portions 44b2. The present configuration allows the magnetic collection portions 44a1 and 44b1 to be provided at positions offset from the circular-arc portions 44a2 and 44b2 in the Z-axis direction. As a result, the steering torque sensor 32 can prevent or reduce interference between the substrate 46 and the circular-arc portions 44a2 and 44b2 when the magnetic sensor 45 is inserted into between the magnetic collection portion 44a1 and the magnetic collection portion 44b1.

Further, in the steering torque sensor 32 according to the sixth embodiment, the cutout portions 44a3 and 44b3 are formed on the positive sides of the magnetic collection portions 44a1 and 44b1 in the Z-axis direction. The present configuration allows the cutout portions 44a3 and 44b3 to be provided at positions overlapping the magnetic collection portions 44a1 and 44b1 in the circumferential direction with respect to the Z axis. No magnetic field is generated between the cutout portion 44a3 and the cutout portion 44b3. As a result, the steering torque sensor 32 can generate a further great magnetic field between the magnetic collection portion 44a1 and the magnetic collection portion 44b1. Therefore, the steering torque sensor 32 can improve the accuracy of detecting the strength of the magnetic field by the magnetic sensor 45.

Further, in the steering torque sensor 32 according to the sixth embodiment, the distance between the magnetic collection portion 44a1 and the magnetic collection portion 44b1 is set to a shorter distance than the distances between the circular-arc portions 44a2 and the circular-arc portions 44b2. The present configuration allows the steering torque sensor 32 to have lower magnetic resistance between the magnetic collection portion 44a1 and the magnetic collection portion 44b1 than magnetic resistance between the circular-arc portions 44a2 and the circular-arc portions 44b2. As the magnetic resistance reduces, a larger number of magnetic fluxes flow. As a result, the steering torque sensor 32 can improve the accuracy of detecting the strength of the magnetic field by the first magnetic sensor 45a and the second magnetic sensor 45b.

[Effects]

(13) The first magnetic collection mechanism 44a includes the circular-arc portion 44a2 (a first main body portion) overlapping the first annular portion 42a1 of the first yoke member 42a in the direction of the rotational axis of the rotational member 50, and the magnetic collection portion 44a1 (a first protrusion portion) formed so as to protrude beyond the circular-arc portion 44a2 toward the one side in the direction of the rotational axis. The second magnetic collection mechanism 44b includes the circular-arc portion 44b2 (a second main body portion) overlapping the second annular portion 42b1 of the second yoke member 42b in the direction of the rotational axis, and the magnetic collection portion 44b1 (a second protrusion portion) formed so as to protrude beyond the circular-arc portion 44b2 toward the one side in the direction of the rotational axis. The first magnetic sensor 45a and the second magnetic sensor 45b are provided between the magnetic collection portion 44a1 and the magnetic collection portion 44b1.

Therefore, the steering torque sensor 32 can prevent or reduce interference between the substrate 46 and the circular-arc portions 44a2 and 44b2 when the magnetic sensor 45 is inserted into between the magnetic collection portion 44a1 and the magnetic collection portion 44b1.

(14) The first magnetic collection mechanism 44a includes the cutout portion 44a3 (a first cutout portion) provided on the circular-arc portion 44a2 and provided on the region overlapping the magnetic collection portion 44a1 in the direction around the rotational axis of the rotational member 50. The second magnetic collection mechanism 44b includes the cutout portion 44b3 (a second cutout portion) provided on the circular-arc portion 44b2 and provided on the region overlapping the magnetic collection portion 44b1 in the direction around the rotational axis of the rotational member 50.

Therefore, the steering torque sensor 32 can improve the accuracy of detecting the strength of the magnetic field by the magnetic sensor 45.

(15) The first magnetic collection mechanism 44a and the second magnetic collection mechanism 44b are formed in such a manner that the distance between the first magnetic collection mechanism 44a and the second magnetic collection mechanism 44b is shorter in the region facing the first magnetic sensor 45a and the second magnetic sensor 45b than in the other region.

Therefore, the steering torque sensor 32 can improve the accuracy of detecting the strength of the magnetic field by the first magnetic sensor 45a and the second magnetic sensor 45b.

Seventh Embodiment

A steering torque sensor 32 according to a seventh embodiment will be described. The steering torque sensor 32 according to the seventh embodiment is different from the steering torque sensor 32 according to the first embodiment in terms of the structures of the substrate 46 and the magnetic collection mechanism 44. In the following description, similar configurations to the first embodiment will not be described.

Figure 20:
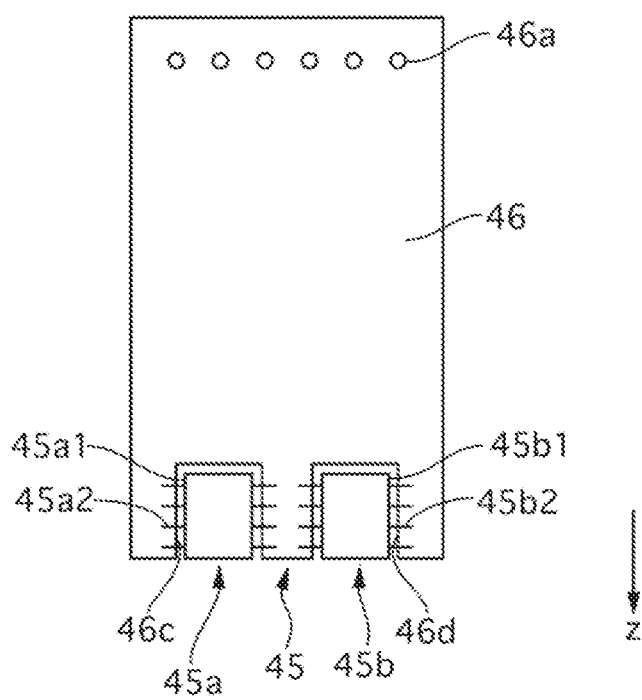
FIG. 20 is a schematic view of a substrate according to a seventh embodiment.

FIG. 20 is a schematic view of the substrate 46. The substrate 46 is formed into a rectangular plate-like shape. The six bus bar insertion holes 46a are formed on the one side of the substrate 46 in the longitudinal direction. The bus bar insertion holes 46a are formed on the same straight line extending in the width direction of the substrate 46. Two cutout portions 46c and 46d are formed on the other side of the substrate 46 in the longitudinal direction. The cutout portions 46c and 46d are each formed into a rectangular shape extending from the short side of the substrate 46 in the longitudinal direction.

The first magnetic sensor 45a and the second magnetic sensor 45b are mounted on the substrate 46. The first magnetic sensor 45a and the second magnetic sensor 45b are mounted in such an orientation that the leads 45a2 and 45b2 extend in the width direction of the substrate 46. The first magnetic sensor 45a is disposed in the cutout portion 46c of the substrate 46. The second magnetic sensor 45b is disposed in the cutout portion 46d of the substrate 46.

Figure 21:
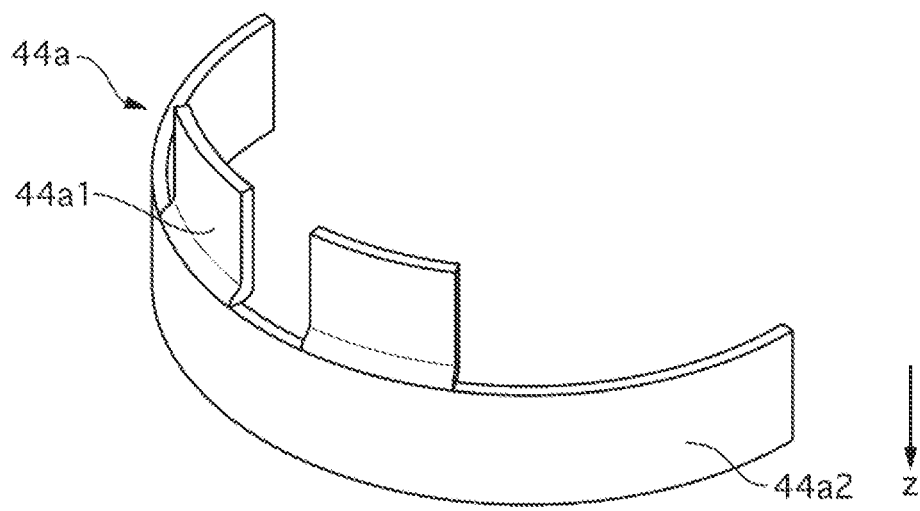
FIG. 21 is a perspective view of a first magnetic collection mechanism according to the seventh embodiment.
Figure 22:
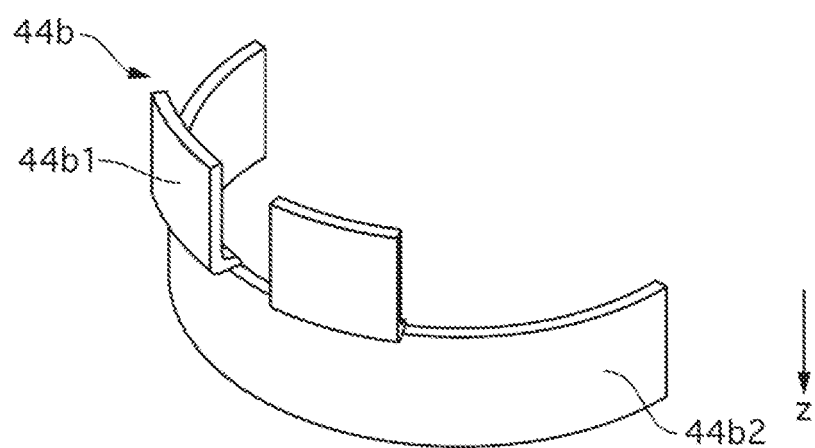
FIG. 22 is a perspective view of a second magnetic collection mechanism according to the seventh embodiment.

FIG. 21 is a perspective view of the first magnetic collection mechanism 44a. FIG. 22 is a perspective view of the second magnetic collection mechanism 44b. The first magnetic collection mechanism 44a is formed into a plate-like shape curved in a circular-arc manner as a whole. The first magnetic collection mechanism 44a is formed in such a manner that the angle defined between both the ends thereof matches approximately 180 degrees, when being viewed from the Z-axis direction. The first magnetic collection mechanism 44a includes the magnetic collection portion 44a1 and the circular-arc portions 44a2. The circular-arc portions 44a2 are formed so as to extend in a circular-arc manner. The magnetic collection portion 44a1 protrudes from the circular-arc portions 44a2 toward the negative side in the Z-axis direction. Two magnetic collection portions 44a1 are formed so as to be spaced apart from each other in the circumferential direction of the circular-arc portions 44a2. The two magnetic collection portions 44a1 are formed at positions overlapping the cutout portions 46c and 46d of the substrate 46 in the circumferential direction of the Z axis, respectively. When the first magnetic collection mechanism 44a is viewed from the Z-axis direction, the magnetic collection portion 44a1 is located on the inner peripheral side with respect to the circular-arc portions 44a2.

The second magnetic collection mechanism 44b is formed into a plate-like shape curved in a circular-arc manner as a whole. The second magnetic collection mechanism 44b is formed in such a manner that the angle defined between both the ends thereof matches approximately 180 degrees, when being viewed from the Z-axis direction. The second magnetic collection mechanism 44b includes the magnetic collection portion 44b1 and the circular-arc portions 44b2. The circular-arc portions 44b2 are formed so as to extend in a circular-arc manner. The magnetic collection portion 44b1 protrudes from the circular-arc portions 44b2 toward the negative side in the Z-axis direction. Two magnetic collection portions 44b1 are formed so as to be spaced apart from each other in the circumferential direction of the circular-arc portions 44b2. The two magnetic collection portions 44b1 are formed at positions overlapping the cutout portions 46c and 46d of the substrate 46 in the circumferential direction of the Z axis, respectively. When the second magnetic collection mechanism 44b is viewed from the Z-axis direction, the magnetic collection portion 44b1 is located on the outer peripheral side with respect to the circular-arc portions 44b2.

The magnetic collection mechanism 44 is held in the yoke holder 43. When the magnetic collection mechanism 44 is viewed from the Z-axis direction, the first magnetic collection mechanism 44a and the second magnetic collection mechanism 44b are disposed on the concentric circles centered at a rotational axis of the rotational member 50. The second magnetic collection mechanism 44b is disposed on the inner peripheral side of the first magnetic collection mechanism 44a. The first magnetic collection mechanism 44a and the second magnetic collection mechanism 44b are disposed in such a manner that the inner peripheral side of the magnetic collection portion 44a1 and the outer peripheral side of the magnetic collection portion 44b1 face each other. The distance between the magnetic collection portion 44a1 and the magnetic collection portion 44b1 is shorter than the distances between the circular-arc portions 44a2 and the circular-arc portions 44b2.

The magnetic collection mechanism 44 is disposed between the first annular portion 42a1 of the first yoke member 42a and the second annular portion 42b1 of the second yoke member 42b. The first magnetic collection mechanism 44a is disposed in such a manner that the outer peripheral surface of the first magnetic collection mechanism 44a faces the inner peripheral surface of the first annular portion 42a1. The second magnetic collection mechanism 44b is disposed in such a manner that the inner peripheral surface of the second magnetic collection mechanism 44b faces the outer peripheral surface of the second annular portion 42b1.

[Functions]

The steering torque sensor 32 according to the seventh embodiment includes the two magnetic collection portions 44a1 protruding from the circular-arc portion 44a2 of the first magnetic collection mechanism 44a. Further, the steering torque sensor 32 includes the two magnetic collection portions 44b1 protruding from the circular-arc portion 44b2 of the second magnetic collection mechanism 44b. Further, the cutout portions 46c and 46d are formed on the substrate 46 at the positions overlapping the magnetic collection portions 44a1 and 44b1 in the circumferential direction with respect to the Z axis. The first magnetic sensor 45a and the second magnetic sensor 45b are set in the cutout portions 46c and 46d, respectively. When the first magnetic sensor 45a and the second magnetic sensor 45b are inserted into between the magnetic collection portions 44a1 and 44b1, the substrate 46 is not inserted into between the magnetic collection portions 44a1 and 44b1. The present configuration allows the distance between the magnetic collection portion 44a1 and the magnetic collection portion 44b1 to be set in consideration of only the thicknesses of the main body portions 45a1 and 45b1 of the magnetic sensor 45. The present configuration allows the steering torque sensor 32 to have a short distance between the magnetic collection portion 44a1 and the magnetic collection portion 44b1 compared to when the substrate 46 is inserted into between the magnetic collection portion 44a1 and the magnetic collection portion 44b1. As a result, the steering torque sensor 32 can improve the accuracy of detecting the strength of the magnetic field by the first magnetic sensor 45a and the second magnetic sensor 45b.

[Effects]

(16) The substrate 46 includes the cutout portions 46c and 46d (a sensor substrate cutout portion) provided on the region overlapping the magnetic collection portion 44a1 and the magnetic collection portion 44*b*1 in the direction of the rotational axis and the direction around the rotational axis of the rotational member 50.

Therefore, the steering torque sensor 32 can improve the accuracy of detecting the strength of the magnetic field by the first magnetic sensor 45*a* and the second magnetic sensor 45*b*.

Other Embodiments

Having described the present invention based on the first embodiment to the seventh embodiment thereof, the specific configuration of each invention is not limited to the first embodiment to the seventh embodiment, and the present invention also includes a design modification and the like thereof made within a range that does not depart from the spirit of the present invention.

In the first embodiment, the first magnetic sensor 45*a* and the second magnetic sensor 45*b* share the circuit for supplying power from the battery and the ground circuit. The first magnetic sensor 45*a* and the second magnetic sensor 45*b* may share the signal output circuit.

Figure 23:
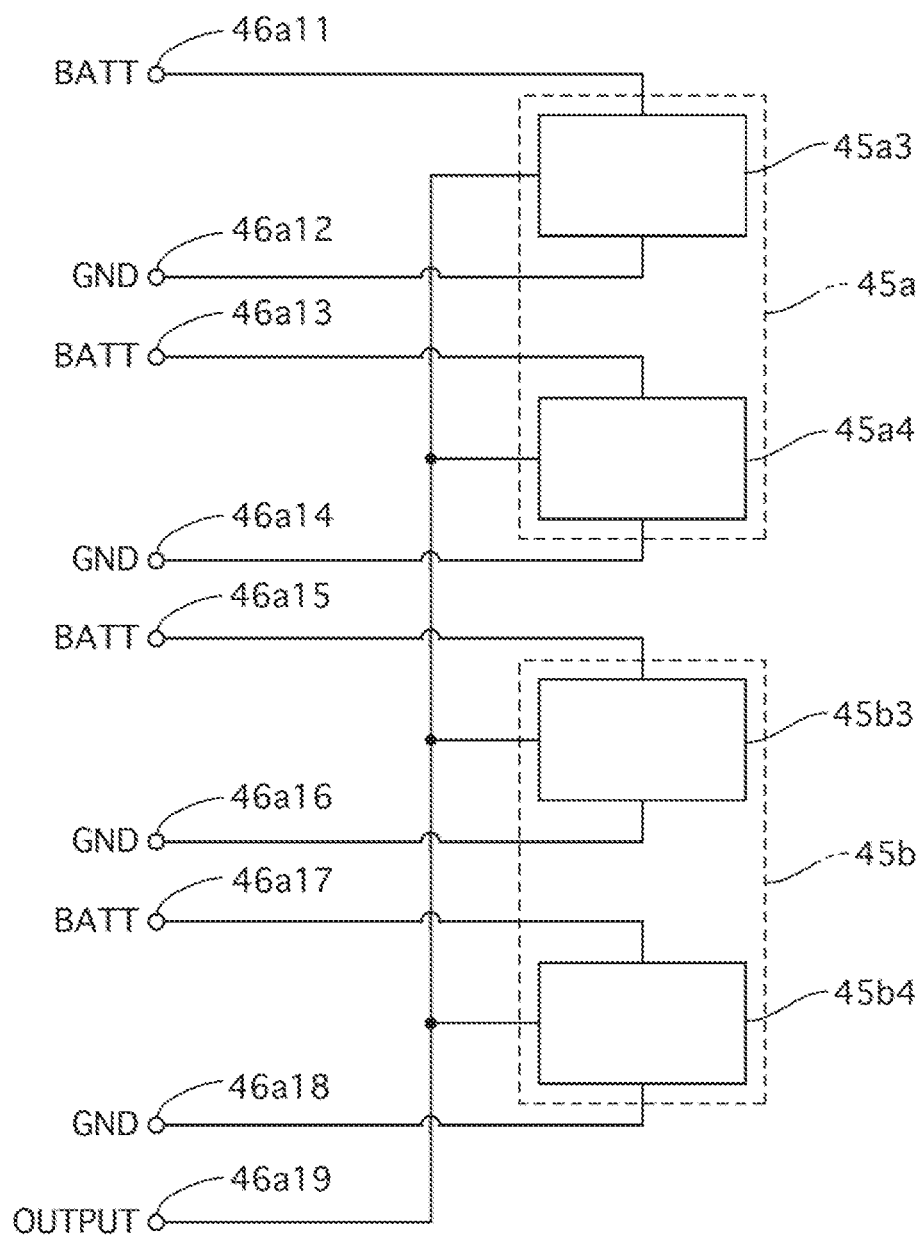
FIG. 23 illustrates a circuit configuration according to another embodiment.

FIG. 23 illustrates a circuit configuration between the first magnetic sensor 45*a* and the second magnetic sensor 45*b*, and the bus bar insertion holes 46*a*. The bus bar insertion holes 46*a* include a first bus bar insertion hole 46*a*11, a second bus bar insertion hole 46*a*12, a third bus bar insertion hole 46*a*13, a fourth bus bar insertion hole 46*a*14, a fifth bus bar insertion hole 46*a*15, a sixth bus bar insertion hole 46*a*16, a seventh bus bar insertion hole 46*a*17, an eighth bus bar insertion hole 46*a*18, and a ninth bus bar insertion hole 46*a*19.

Power is input from the battery to the first bus bar insertion hole 46*a*11. The first bus bar insertion hole 46*a*11 is connected to the power port of the first die 45*a*3 of the first magnetic sensor 45*a*. The second bus bar insertion hole 46*a*12 is grounded. The second bus bar insertion hole 46*a*12 is connected to the ground port of the first die 45*a*3 of the first magnetic sensor 45*a*.

Power is input from the battery to the third bus bar insertion hole 46*a*13. The third bus bar insertion hole 46*a*13 is connected to the power port of the second die 45*a*4 of the first magnetic sensor 45*a*. The fourth bus bar insertion hole 46*a*14 is grounded. The fourth bus bar insertion hole 46*a*14 is connected to the ground port of the second die 45*a*4 of the first magnetic sensor 45*a*.

Power is input from the battery to the fifth bus bar insertion hole 46*a*15. The fifth bus bar insertion hole 46*a*15 is connected to the power port of the first die 45*b*3 of the second magnetic sensor 45*b*. The sixth bus bar insertion hole 46*a*16 is grounded. The sixth bus bar insertion hole 46*a*16 is connected to the ground port of the first die 45*b*3 of the second magnetic sensor 45*b*.

Power is input from the battery to the seventh bus bar insertion hole 46*a*17. The seventh bus bar insertion hole 46*a*17 is connected to the power port of the second die 45*b*4 of the second magnetic sensor 45*b*. The eighth bus bar insertion hole 46*a*18 is grounded. The eighth bus bar insertion hole 46*a*18 is connected to the ground port of the second die 45*b*4 of the second magnetic sensor 45*b*.

The ninth bus bar insertion hole 46*a*19 outputs the signals of the first dies 45*a*3 and 45*b*3 and the second dies 45*a*4 and 45*b*4 of the first magnetic sensor 45*a* and the second magnetic sensor 45*b*. The ninth bus bar insertion hole 46*a*19 is connected to the signal ports of the first dies 45*a*3 and 45*b*3 and the second dies 45*a*4 and 45*b*4 of the first magnetic sensor 45*a* and the second magnetic sensor 45*b*. The first die 45*a*3 and the second die 45*a*4 of the first magnetic sensor 45*a*, and the first die 45*b*3 and the second die 45*b*4 of the second magnetic sensor 45*b* output the signals at different timings from each other.

In the following description, other configurations recognizable from the above-described embodiments will be described together with advantageous effects thereof.

A torque sensor includes a rotational member including a first shaft and a second shaft connected to each other via a torsion bar; a magnet provided at the first shaft rotatably according to a rotation of the first shaft, annularly formed, and arranged in such a manner that an N pole and an S pole are disposed alternately in a circumferential direction; a first yoke member provided at the second shaft rotatably according to a rotation of the second shaft, made from a magnetic material, and including first claw portions, which are a plurality of plate-like members disposed so as to face the magnet, and a first annular portion formed annularly and connecting the first claw portions to one another; a second yoke member provided at the second shaft rotatably according to the rotation of the second shaft, made from a magnetic material, including second claw portions, which are a plurality of plate-like members disposed so as to face the magnet, and a second annular portion formed annularly and connecting the second claw portions to one another, and disposed in such a manner that each of the second claw portions is disposed so as to be arranged alternately between the respective claw portions of the first claw portions; a first magnetic collection mechanism provided so as to face the first annular portion and be spaced apart from the first annular portion, and formed into a circular-arc shape along a direction around a rotational axis of the rotational member with use of a magnetic material; a second magnetic collection mechanism provided so as to face the second annular portion and be spaced apart from the second annular portion, and formed into a circular-arc shape along the direction around the rotational axis of the rotational member with use of a magnetic material; a surface-mount first magnetic sensor provided between the first magnetic collection mechanism and the second magnetic collection mechanism in a radial direction of the rotational axis of the rotational member and including a Hall element configured to detect a magnetic field between the first magnetic collection mechanism and the second magnetic collection mechanism; a surface-mount second magnetic sensor provided between the first magnetic collection mechanism and the second magnetic collection mechanism in the radial direction of the rotational axis of the rotational member and including a Hall element configured to detect a change in the magnetic field between the first magnetic collection mechanism and the second magnetic collection mechanism; and a sensor substrate on which the first magnetic sensor and the second magnetic sensor are mounted. The torque sensor detects a torque generated on the rotational member based on an output signal of the first magnetic sensor or the second magnetic sensor.

Therefore, the surface-mount first magnetic sensor and second magnetic sensor can be disposed between the first magnetic collection mechanism and the second magnetic collection mechanism by being inserted in the direction of the rotational axis.

According to a further preferable configuration, in the above-described configuration, the first magnetic sensor and the second magnetic sensor are provided on a region where magnetic resistance is minimized, in a region between the first magnetic collection mechanism and the second magnetic collection mechanism.

Therefore, the torque sensor can improve accuracy of detecting a strength of the magnetic field by the first magnetic sensor and the second magnetic sensor.

According to a further preferable configuration, in any of the above-described configurations, the first magnetic collection mechanism includes a first main body portion overlapping the first annular portion in a direction of the rotational axis of the rotational member, and a first protrusion portion formed so as to protrude beyond the first main body portion toward one side in the direction of the rotational axis. The second magnetic collection mechanism includes a second main body portion overlapping the second annular portion in the direction of the rotational axis, and a second protrusion portion formed so as to protrude beyond the second main body portion toward the one side in the direction of the rotational axis. The first magnetic sensor and the second magnetic sensor are provided between the first protrusion portion and the second protrusion portion.

Therefore, the torque sensor can prevent or reduce interference between the substrate and the first main body portion and the second main body portion when the first magnetic sensor and the second magnetic sensor are inserted into between the first protrusion portion and the second protrusion portion.

According to a further preferable configuration, in any of the above-described configurations, the first magnetic collection mechanism includes a first cutout portion provided on the first main body portion and provided on a region overlapping the first protrusion portion in the direction around the rotational axis of the rotational member. The second magnetic collection mechanism includes a second cutout portion provided on the second main body portion and provided on a region overlapping the second protrusion portion in the direction around the rotational axis of the rotational member.

Therefore, the torque sensor can improve the accuracy of detecting the strength of the magnetic field by the first magnetic sensor and the second magnetic sensor.

According to a further preferable configuration, in any of the above-described configurations, the sensor substrate includes a sensor substrate cutout portion, which is a cutout portion provided on a region overlapping the first protrusion portion and the second protrusion portion in the direction of the rotational axis and the direction around the rotational axis of the rotational member.

Therefore, the torque sensor can improve the accuracy of detecting the strength of the magnetic field by the first magnetic sensor and the second magnetic sensor.

According to a further preferable configuration, in any of the above-described configurations, the first magnetic collection mechanism and the second magnetic collection mechanism are formed in such a manner that a distance between the first magnetic collection mechanism and the second magnetic collection mechanism is shorter in a region facing the first magnetic sensor and the second magnetic sensor than in the other region.

Therefore, the torque sensor can improve the accuracy of detecting the strength of the magnetic field by the first magnetic sensor and the second magnetic sensor.

According to a further preferable configuration, in any of the above-described configurations, the torque sensor further includes a sensor housing containing the first yoke member, the second yoke member, the first magnetic collection mechanism, the second magnetic collection mechanism, the first magnetic sensor, the second magnetic sensor, and the sensor substrate, and including a connector insertion hole which is a through-hole extending in the radial direction of the rotational axis of the rotational member; a sensor harness configured to output detection signals of the first magnetic sensor and the second magnetic sensor to outside the sensor housing; a connector portion inserted in the connector insertion hole and configured to fix the sensor harness to the sensor housing, and a connection terminal connecting the sensor harness and the sensor substrate. The sensor substrate is provided in such a manner that a mount surface extends generally in parallel with the rotational axis of the rotational member. The connector insertion hole is formed in such a manner that a cross section thereof perpendicular to the radial direction of the rotational axis of the rotational member is generally circular, and that a diameter of the circular cross section is larger than a longest dimension of the sensor substrate. The connection terminal includes a bent portion which is bent between the sensor harness side and the sensor substrate side so as to be connected to the sensor substrate at a position that passes through a generally central portion of the circular cross section of the connector insertion hole on the sensor harness side and is offset from the generally central portion of the circular cross section on the sensor substrate side.

Therefore, the torque sensor can secure a large insertion margin used when the sensor substrate is inserted into between the first magnetic collection mechanism and the second magnetic collection mechanism.

According to a further preferable configuration, in any of the above-described configurations, the torque sensor further includes a second sensor substrate provided in such a manner that a mount surface extends generally perpendicularly to the rotational axis of the rotational member. The sensor substrate is provided so as to extend from the second sensor substrate in the direction of the rotational axis of the rotational member.

Therefore, the torque sensor can improve design flexibility of circuits on the sensor substrate and the second sensor substrate.

According to a further preferable configuration, in any of the above-described configurations, the first magnetic sensor and the second magnetic sensor are provided so as to overlap the sensor substrate in a direction of a thickness of the sensor substrate.

The torque sensor can improve the accuracy of detecting the strength of the magnetic field by the first magnetic sensor and the second magnetic sensor.

According to a further preferable configuration, in any of the above-described configurations, the sensor substrate includes a sensor substrate cutout portion, which is a cutout portion provided in a region overlapping the first magnetic sensor and the second magnetic sensor in a direction of the rotational axis and in a direction around the rotational axis of the rotational member. The first magnetic sensor and the second magnetic sensor are provided so as to be located adjacent to each other in the direction around the rotational axis.

Therefore, the torque sensor can achieve a reduction in a size of the sensor substrate in a width direction.

According to a further preferable configuration, in any of the above-described configurations, the sensor substrate is provided in such a manner that a mount surface extends generally in parallel with the rotational axis of the rotational member. The first magnetic sensor and the second magnetic sensor are connected to the sensor substrate in such a manner that each of a lead of the first magnetic sensor and a lead of the second magnetic sensor extends in a direction of the rotational axis of the rotational member.

Therefore, the torque sensor can achieve the reduction in the size of the sensor substrate in the width direction.

According to a further preferable configuration, in any of the above-described configurations, the torque sensor further includes a cover member made from an insulating material and configured to surround the lead of the first magnetic sensor and the lead of the second magnetic sensor.

Therefore, the torque sensor can prevent or reduce occurrence of short-circuiting between the first magnetic sensor and the second magnetic sensor and the first magnetic collection mechanism and the second magnetic collection mechanism.

According to a further preferable configuration, in any of the above-described configurations, the first magnetic sensor and the second magnetic sensor are mounted on the sensor substrate in such a manner that front and back sides thereof face opposite from each other.

Therefore, the torque sensor can acquire signals having opposite plus and minus signs from each other from the first magnetic sensor 45a and the second magnetic sensor 45b.

According to a further preferable configuration, in any of the above-described configurations, the first magnetic sensor and the second magnetic sensor are disposed so as to be arranged in series in a direction of the rotational axis of the rotational member.

Therefore, the torque sensor can achieve the reduction in the size of the sensor substrate in the width direction.

According to a further preferable configuration, in any of the above-described configurations, the torque sensor further includes a sensor housing containing the first yoke member, the second yoke member, the first magnetic collection mechanism, the second magnetic collection mechanism, the first magnetic sensor, the second magnetic sensor, and the sensor substrate, and including a connector insertion hole which is a through-hole extending in the radial direction of the rotational axis of the rotational member; a sensor harness configured to output detection signals of the first magnetic sensor and the second magnetic sensor to outside the sensor housing; a connector portion inserted in the connector insertion hole and configured to fix the sensor harness to the sensor housing, and a connection terminal connecting the sensor harness and the sensor substrate. The sensor substrate is formed integrally with the connector portion.

Therefore, the torque sensor can achieve a reduction in the number of components. Further, the torque sensor can achieve enhancement of an assembling strength between the sensor substrate and the connector portion.

According to a further preferable configuration, in any of the above-described configurations, the first magnetic sensor and the second magnetic sensor are disposed on the same magnetic field.

Therefore, the torques sensor can prevent or reduce errors in the detection of the strength of the magnetic field detected by the first magnetic sensor and the second magnetic sensor.

A torque sensor includes a rotational member including a first shaft and a second shaft connected to each other via a torsion bar; a magnet provided at the first shaft rotatably according to a rotation of the first shaft, annularly formed, and arranged in such a manner that an N pole and an S pole are disposed alternately in a circumferential direction; a first yoke member provided at the second shaft rotatably according to a rotation of the second shaft, made from a magnetic material, and including first claw portions, which are a plurality of plate-like members disposed so as to face the magnet; a second yoke member provided at the second shaft rotatably according to the rotation of the second shaft, made from a magnetic material, and including second claw portions, which are a plurality of plate-like members disposed so as to face the magnet; a surface-mount magnetic sensor including a plurality of Hall elements configured to detect a magnetic field between the first yoke member and the second yoke member; and a sensor substrate on which the magnetic sensor is mounted. The torque sensor detects a torque generated on the rotational member based on an output signal of the magnetic sensor.

Therefore, the torque sensor allows the magnetic sensor to detect strengths of a plurality of magnetic fields, thereby improving accuracy of detecting an abnormality in the detection signal.

According to a further preferable configuration, in the above-described configuration, the first yoke member includes an annular portion formed annularly and connecting the first claw portions to one another. The second yoke member includes an annular portion formed annularly and connecting the second claw portions to one another. The torque sensor further includes a first magnetic collection mechanism provided so as to face the first annular portion and be spaced apart from the first annular portion, and made from a magnetic material, and a second magnetic collection mechanism provided so as to face the second annular portion and be spaced apart from the second annular portion, and made from a magnetic material. The magnetic sensor is provided so as to detect a magnetic field between the first magnetic collection mechanism and the second magnetic collection mechanism.

Therefore, the torque sensor can improve the accuracy of detecting the strength of the magnetic field by the magnetic sensor.

Having described several embodiments of the present invention, the above-described embodiments of the present invention are intended to only facilitate the understanding of the present invention, and are not intended to limit the present invention thereto. The present invention can be modified or improved without departing from the spirit thereof, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority to Japanese Patent Application No. 2016-114227 filed on Jun. 8, 2016. The entire disclosure of Japanese Patent Application No. 2016-114227 filed on Jun. 8, 2016 including the specification, the claims, the drawings, and the abstract is incorporated herein by reference in its entirety.

REFERENCE SIGN LIST 5 steering shaft (second shaft)
6 pinion shaft (first shaft)
20 magnet
30a through-hole (connector insertion hole)
32 steering torque sensor
40 torsion bar
42a first yoke member
42a1 first annular portion (first annular portion)
42a2 first claw portion (first claw portion)
42b second yoke member
42b1 second annular portion (second annular portion)
42b2 second claw portion (second claw portion)
44a first magnetic collection mechanism (first magnetic collection mechanism)
44a1 magnetic collection portion (first protrusion portion)

44*a*2 circular-arc portion (first main body portion)
44*a*3 cutout portion (first cutout portion)
44*b* second magnetic collection mechanism (second magnetic collection mechanism)
44*b*1 magnetic collection portion (second protrusion portion)
44*b*2 circular-arc portion (second main body portion)
44*b*3 cutout portion (second cutout portion)
45*a* first magnetic sensor (first magnetic sensor)
45*a*2 lead
45*b* second magnetic sensor (second magnetic sensor)
45*b*2 lead
46 substrate (sensor substrate)
46*b* opening portion (sensor substrate cutout portion)
46*c* cutout portion (sensor substrate cutout portion)
46*d* cutout portion (sensor substrate cutout portion)
47 wire harness (sensor harness)
47*a* connector (connector portion)
48 bus bar (connection terminal)
48*a* first bent portion (bent portion)
48*b* second bent portion (bent portion)
49 substrate (second sensor substrate)
50 rotational member
52 bus bar (connection terminal)
53 insulating sheet (cover member)

The invention claimed is:
1. A torque sensor comprising:
a rotational member including a first shaft and a second shaft connected to each other via a torsion bar;
a magnet provided at the first shaft rotatably according to a rotation of the first shaft, the magnet being annularly formed, the magnet being arranged in such a manner that an N pole and an S pole are disposed alternately in a circumferential direction,
a first yoke member provided at the second shaft rotatably according to a rotation of the second shaft, the first yoke member being made from a magnetic material, the first yoke member including first claw portions, which are a plurality of plate-like members disposed so as to face the magnet, and a first annular portion formed annularly and connecting the first claw portions to one another;
a second yoke member provided at the second shaft rotatably according to the rotation of the second shaft, the second yoke member being made from a magnetic material, the second yoke member including second claw portions, which are a plurality of plate-like members disposed so as to face the magnet, and a second annular portion formed annularly and connecting the second claw portions to one another, the second yoke member being disposed in such a manner that each of the second claw portions is disposed so as to be arranged alternately between the respective claw portions of the first claw portions;
a first magnetic collection mechanism provided so as to face the first annular portion and be spaced apart from the first annular portion, the first magnetic collection mechanism being formed into a circular-arc shape along a direction around a rotational axis of the rotational member with use of a magnetic material;
a second magnetic collection mechanism provided so as to face the second annular portion and be spaced apart from the second annular portion, the second magnetic collection mechanism being formed into a circular-arc shape along the direction around the rotational axis of the rotational member with use of a magnetic material;
a surface-mount first magnetic sensor provided between the first magnetic collection mechanism and the second magnetic collection mechanism in a radial direction of the rotational axis of the rotational member, and including a Hall element configured to detect a magnetic field between the first magnetic collection mechanism and the second magnetic collection mechanism;
a surface-mount second magnetic sensor provided between the first magnetic collection mechanism and the second magnetic collection mechanism in the radial direction of the rotational axis of the rotational member, and including a Hall element configured to detect a change in the magnetic field between the first magnetic collection mechanism and the second magnetic collection mechanism; and
a sensor substrate on which the first magnetic sensor and the second magnetic sensor are mounted,
wherein the torque sensor detects a torque generated on the rotational member based on an output signal of the first magnetic sensor or the second magnetic sensor,
wherein the sensor substrate is provided in such a manner that a mount surface extends generally perpendicularly to the rotational axis of the rotational member, and
wherein the first magnetic sensor and the second magnetic sensor are provided so as to extend from the sensor substrate in the direction of the rotational axis of the rotational member.
2. A torque sensor comprising:
a rotational member including a first shaft and a second shaft connected to each other via a torsion bar;
a magnet provided at the first shaft rotatably according to a rotation of the first shaft, the magnet being annularly formed, the magnet being arranged in such a manner that an N pole and an S pole are disposed alternately in a circumferential direction,
a first yoke member provided at the second shaft rotatably according to a rotation of the second shaft, the first yoke member being made from a magnetic material, the first yoke member including first claw portions, which are a plurality of plate-like members disposed so as to face the magnet, and a first annular portion formed annularly and connecting the first claw portions to one another;
a second yoke member provided at the second shaft rotatably according to the rotation of the second shaft, the second yoke member being made from a magnetic material, the second yoke member including second claw portions, which are a plurality of plate-like members disposed so as to face the magnet, and a second annular portion formed annularly and connecting the second claw portions to one another, the second yoke member being disposed in such a manner that each of the second claw portions is disposed so as to be arranged alternately between the respective claw portions of the first claw portions;
a first magnetic collection mechanism provided so as to face the first annular portion and be spaced apart from the first annular portion, the first magnetic collection mechanism being formed into a circular-arc shape along a direction around a rotational axis of the rotational member with use of a magnetic material;
a second magnetic collection mechanism provided so as to face the second annular portion and be spaced apart from the second annular portion, the second magnetic collection mechanism being formed into a circular-arc shape along the direction around the rotational axis of the rotational member with use of a magnetic material;

a surface-mount first magnetic sensor provided between the first magnetic collection mechanism and the second magnetic collection mechanism in a radial direction of the rotational axis of the rotational member, and including a Hall element configured to detect a magnetic field between the first magnetic collection mechanism and the second magnetic collection mechanism;
a surface-mount second magnetic sensor provided between the first magnetic collection mechanism and the second magnetic collection mechanism in the radial direction of the rotational axis of the rotational member, and including a Hall element configured to detect a change in the magnetic field between the first magnetic collection mechanism and the second magnetic collection mechanism; and
a sensor substrate on which the first magnetic sensor and the second magnetic sensor are mounted,
wherein the torque sensor detects a torque generated on the rotational member based on an output signal of the first magnetic sensor or the second magnetic sensor,
wherein the sensor substrate is provided in such a manner that a mount surface extends generally in parallel with the rotational axis of the rotational member, and
wherein the first magnetic sensor and the second magnetic sensor are connected to the sensor substrate in such a manner that each of a lead of the first magnetic sensor and a lead of the second magnetic sensor extends in a direction of the rotational axis of the rotational member.

3. The torque sensor according to claim 2, wherein the first magnetic sensor and the second magnetic sensor are provided on a region where magnetic resistance is minimized, in a region between the first magnetic collection mechanism and the second magnetic collection mechanism.

4. The torque sensor according to claim 3, wherein the first magnetic collection mechanism includes a first main body portion overlapping the first annular portion in a direction of the rotational axis of the rotational member, and a first protrusion portion formed so as to protrude beyond the first main body portion toward one side in the direction of the rotational axis,
wherein the second magnetic collection mechanism includes a second main body portion overlapping the second annular portion in the direction of the rotational axis, and a second protrusion portion formed so as to protrude beyond the second main body portion toward the one side in the direction of the rotational axis, and
wherein the first magnetic sensor and the second magnetic sensor are provided between the first protrusion portion and the second protrusion portion.

5. The torque sensor according to claim 4, wherein the first magnetic collection mechanism includes a first cutout portion provided on the first main body portion, and provided on a region overlapping the first protrusion portion in the direction around the rotational axis of the rotational member, and
wherein the second magnetic collection mechanism includes a second cutout portion provided on the second main body portion, and provided on a region overlapping the second protrusion portion in the direction around the rotational axis of the rotational member.

6. The torque sensor according to claim 4, wherein the sensor substrate includes a sensor substrate cutout portion, which is a cutout portion provided on a region overlapping the first protrusion portion and the second protrusion portion in the direction of the rotational axis and the direction around the rotational axis of the rotational member.

7. The torque sensor according to claim 3, wherein the first magnetic collection mechanism and the second magnetic collection mechanism are formed in such a manner that a distance between the first magnetic collection mechanism and the second magnetic collection mechanism is shorter in a region facing the first magnetic sensor and the second magnetic sensor than in the other region.

8. The torque sensor according to claim 2, further comprising a sensor housing containing the first yoke member, the second yoke member, the first magnetic collection mechanism, the second magnetic collection mechanism, the first magnetic sensor, the second magnetic sensor, and the sensor substrate, the sensor housing including a connector insertion hole which is a through-hole extending in the radial direction of the rotational axis of the rotational member;
a sensor harness configured to output detection signals of the first magnetic sensor and the second magnetic sensor to outside the sensor housing;
a connector portion inserted in the connector insertion hole and configured to fix the sensor harness to the sensor housing; and
a connection terminal connecting the sensor harness and the sensor substrate,
wherein the sensor substrate is provided in such a manner that a mount surface extends generally in parallel with the rotational axis of the rotational member,
wherein the connector insertion hole is formed in such a manner that a cross section thereof perpendicular to the radial direction of the rotational axis of the rotational member is generally circular, and that a diameter of the generally circular cross section is larger than a longest dimension of the sensor substrate, and
wherein the connection terminal includes a bent portion which is bent between the sensor harness side and the sensor substrate side so as to be connected to the sensor substrate at a position that passes through a generally central portion of the generally circular cross section of the connector insertion hole on the sensor harness side and is offset from the generally central portion of the generally circular cross section on the sensor substrate side.

9. The torque sensor according to claim 2, wherein the first magnetic sensor and the second magnetic sensor are provided so as to overlap the sensor substrate in a direction of a thickness of the sensor substrate.

10. The torque sensor according to claim 9, wherein the sensor substrate includes a sensor substrate cutout portion, which is a cutout portion provided in a region overlapping the first magnetic sensor and the second magnetic sensor in the direction of the rotational axis and in a direction around the rotational axis of the rotational member, and
wherein the first magnetic sensor and the second magnetic sensor are provided so as to be located adjacent to each other in the direction around the rotational axis.

11. The torque sensor according to claim 2, further comprising a cover member made from an insulating material and configured to surround the lead of the first magnetic sensor and the lead of the second magnetic sensor.

12. The torque sensor according to claim 2, wherein the first magnetic sensor and the second magnetic sensor are disposed so as to be arranged in series in a direction of the rotational axis of the rotational member.

13. The torque sensor according to claim 2, further comprising a sensor housing containing the first yoke member, the second yoke member, the first magnetic collection mechanism, the second magnetic collection mechanism, the first magnetic sensor, the second magnetic sensor, and the sensor substrate, the sensor housing including a connector insertion hole which is a through-hole extending in the radial direction of the rotational axis of the rotational member;
- a sensor harness configured to output detection signals of the first magnetic sensor and the second magnetic sensor to outside the sensor housing;
- a connector portion inserted in the connector insertion hole and configured to fix the sensor harness to the sensor housing; and
- a connection terminal connecting the sensor harness and the sensor substrate,
- wherein the sensor substrate is formed integrally with the connector portion.

14. The torque sensor according to claim 2, wherein the first magnetic sensor and the second magnetic sensor are disposed on the same magnetic field.

15. A torque sensor comprising:
- a rotational member including a first shaft and a second shaft connected to each other via a torsion bar;
- a magnet provided at the first shaft rotatably according to a rotation of the first shaft, the magnet being annularly formed, the magnet being arranged in such a manner that an N pole and an S pole are disposed alternately in a circumferential direction,
- a first yoke member provided at the second shaft rotatably according to a rotation of the second shaft, the first yoke member being made from a magnetic material, the first yoke member including first claw portions, which are a plurality of plate-like members disposed so as to face the magnet, and a first annular portion formed annularly and connecting the first claw portions to one another;
- a second yoke member provided at the second shaft rotatably according to the rotation of the second shaft, the second yoke member being made from a magnetic material, the second yoke member including second claw portions, which are a plurality of plate-like members disposed so as to face the magnet, and a second annular portion formed annularly and connecting the second claw portions to one another, the second yoke member being disposed in such a manner that each of the second claw portions is disposed so as to be arranged alternately between the respective claw portions of the first claw portions;
- a first magnetic collection mechanism provided so as to face the first annular portion and be spaced apart from the first annular portion, the first magnetic collection mechanism being formed into a circular-arc shape along a direction around a rotational axis of the rotational member with use of a magnetic material;
- a second magnetic collection mechanism provided so as to face the second annular portion and be spaced apart from the second annular portion, the second magnetic collection mechanism being formed into a circular-arc shape along the direction around the rotational axis of the rotational member with use of a magnetic material;
- a surface-mount first magnetic sensor provided between the first magnetic collection mechanism and the second magnetic collection mechanism in a radial direction of the rotational axis of the rotational member, and including a Hall element configured to detect a magnetic field between the first magnetic collection mechanism and the second magnetic collection mechanism;
- a surface-mount second magnetic sensor provided between the first magnetic collection mechanism and the second magnetic collection mechanism in the radial direction of the rotational axis of the rotational member, and including a Hall element configured to detect a change in the magnetic field between the first magnetic collection mechanism and the second magnetic collection mechanism; and
- a sensor substrate on which the first magnetic sensor and the second magnetic sensor are mounted,
- wherein the torque sensor detects a torque generated on the rotational member based on an output signal of the first magnetic sensor or the second magnetic sensor, and
- wherein the first magnetic sensor and the second magnetic sensor are mounted on the sensor substrate in such a manner that front and back sides thereof face opposite from each other.

* * * * *